US012684578B2

(12) United States Patent
Li

(10) Patent No.: US 12,684,578 B2
(45) Date of Patent: Jul. 14, 2026

(54) PHYSICAL UPLINK CONTROL CHANNEL RESOURCE DETERMINING METHOD, TERMINAL, AND NETWORK-SIDE DEVICE

(71) Applicant: VIVO MOBILE COMMUNICATION CO., LTD., Chang'an (CN)

(72) Inventor: Can Li, Chang'an (CN)

(73) Assignee: VIVO MOBILE COMMUNICATION CO., LTD., Chang'an (CN)

( * ) Notice: Subject to any disclaimer, the term of this patent is extended or adjusted under 35 U.S.C. 154(b) by 323 days.

(21) Appl. No.: 18/466,264

(22) Filed: Sep. 13, 2023

(65) Prior Publication Data

US 2023/0422253 A1 Dec. 28, 2023

Related U.S. Application Data

(63) Continuation of application No. PCT/CN2022/081653, filed on Mar. 18, 2022.

(30) Foreign Application Priority Data

Mar. 19, 2021 (CN) .......................... 202110297096.2

(51) Int. Cl.
*H04W 72/21* (2023.01)
*H04L 5/00* (2006.01)

(52) U.S. Cl.
CPC ........... *H04W 72/21* (2023.01); *H04L 5/0016* (2013.01); *H04L 5/0053* (2013.01)

(58) Field of Classification Search
CPC .... H04W 72/21; H04L 5/0016; H04L 5/0053; H04L 5/0005; H04L 5/0007; H04L 5/001; H04L 5/00; H04L 5/0094
See application file for complete search history.

(56) References Cited

U.S. PATENT DOCUMENTS

2014/0241298 A1 8/2014 Park et al.
2019/0239286 A1* 8/2019 Chang ................... H04W 88/10
(Continued)

FOREIGN PATENT DOCUMENTS

CN 103249147 A 8/2013
CN 110034903 A 7/2019
(Continued)

OTHER PUBLICATIONS

First Japanese Office Action related to Application No. 2023-555646; reported on Jul. 12, 2024.
(Continued)

*Primary Examiner* — Ayaz R Sheikh
*Assistant Examiner* — Tarell A Hampton
(74) *Attorney, Agent, or Firm* — Foley & Lardner LLP

(57) ABSTRACT

This application discloses a physical uplink control channel resource determining method, a terminal, and a network-side device, and pertains to the field of wireless communications technologies. A physical uplink control channel resource determining method in embodiments of this application is provided, including: receiving, by a terminal, system information, where the system information includes a first index, and the first index is used to indicate one target PUCCH resource set in multiple PUCCH resource sets that are predefined; obtaining, by the terminal, a first target parameter configured for the target PUCCH resource set; and determining, by the terminal based on the first target parameter and a predefined configuration parameter for the target PUCCH resource set, a target physical uplink control channel (PUCCH) resource for use before radio resource control establishment.

20 Claims, 5 Drawing Sheets

200

A terminal receives system information ⟶ S210

The terminal obtains a first target parameter configured for a target PUCCH resource set ⟶ S212

The terminal determines, based on the first target parameter and a predefined configuration parameter for the target PUCCH resource set, a target PUCCH resource for use before radio resource control establishment ⟶ S214

(56) References Cited

U.S. PATENT DOCUMENTS

| | | | |
|---|---|---|---|
| 2019/0261356 A1 | 8/2019 | Sechang et al. | |
| 2020/0137743 A1* | 4/2020 | Yang | H04B 1/713 |
| 2021/0029731 A1 | 1/2021 | Kundu et al. | |
| 2022/0086824 A1* | 3/2022 | Kundu | H04B 1/713 |
| 2022/0377812 A1* | 11/2022 | Jung | H04W 74/0841 |
| 2023/0254868 A1* | 8/2023 | Hou | H04L 5/0058 |
| | | | 370/329 |
| 2023/0319819 A1* | 10/2023 | Wang | H04L 5/0048 |
| | | | 370/336 |
| 2023/0371062 A1* | 11/2023 | He | H04W 74/006 |
| 2024/0121784 A1* | 4/2024 | Talarico | H04W 72/21 |

FOREIGN PATENT DOCUMENTS

| | | | |
|---|---|---|---|
| CN | 111869289 A | 10/2020 | |
| CN | 112242892 A | 1/2021 | |
| JP | 2020507224 A | 3/2020 | |

OTHER PUBLICATIONS

Extended European Search Report related to Application No. 22770627.
2; reported on Jul. 16, 2024.
R1-1800536—NEC "PUCCH resource allocation prior to RRC
configuration" 3GPP TSG RAN WG1 Meeting AH 1801, Vancouver, Canada, Jan. 22-26, 2018.
R1-2102127—Moderator (Ericsson) "FL Summary 4 for Enhancements for PUCCH formats 0/1/4" 3GPP TSG RAN WG1 Meeting
104-e, e-Meeting, Jan. 25-Feb. 5, 2021.
International Search Report & Written Opinion related to Application No. PCT/CN2022/081653; reported on Jun. 1, 2022.

* cited by examiner

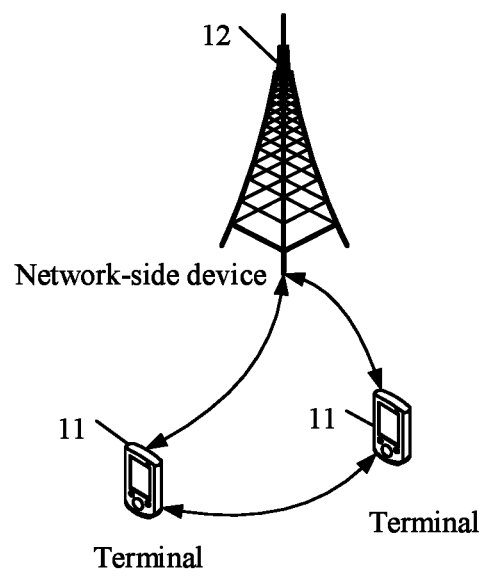

12

Network-side device 11   11

Terminal

Terminal

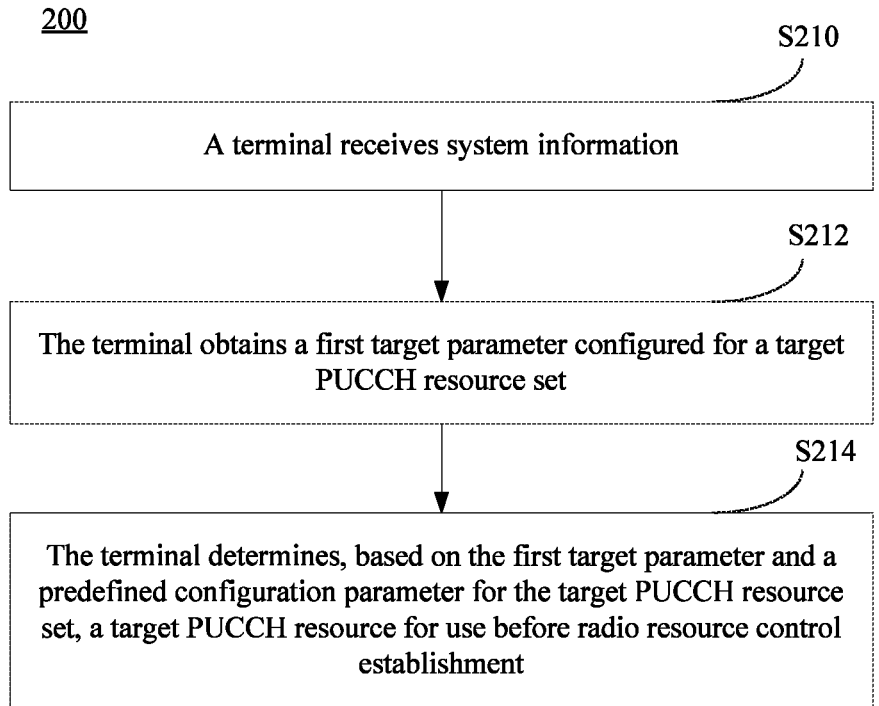

S210

A terminal receives system information

S212

The terminal obtains a first target parameter configured for a target PUCCH resource set

S214

The terminal determines, based on the first target parameter and a predefined configuration parameter for the target PUCCH resource set, a target PUCCH resource for use before radio resource control establishment

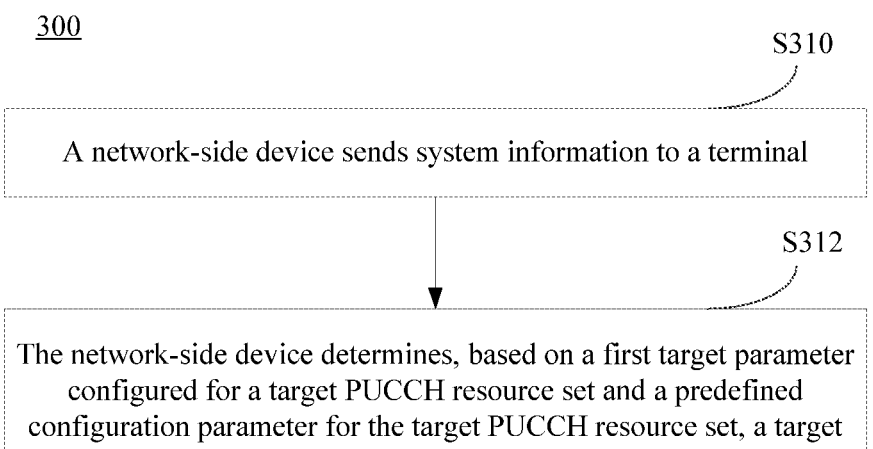

A network-side device sends system information to a terminal

S312

The network-side device determines, based on a first target parameter configured for a target PUCCH resource set and a predefined configuration parameter for the target PUCCH resource set, a target PUCCH resource for use by the terminal before radio resource control establishment

FIG. 3

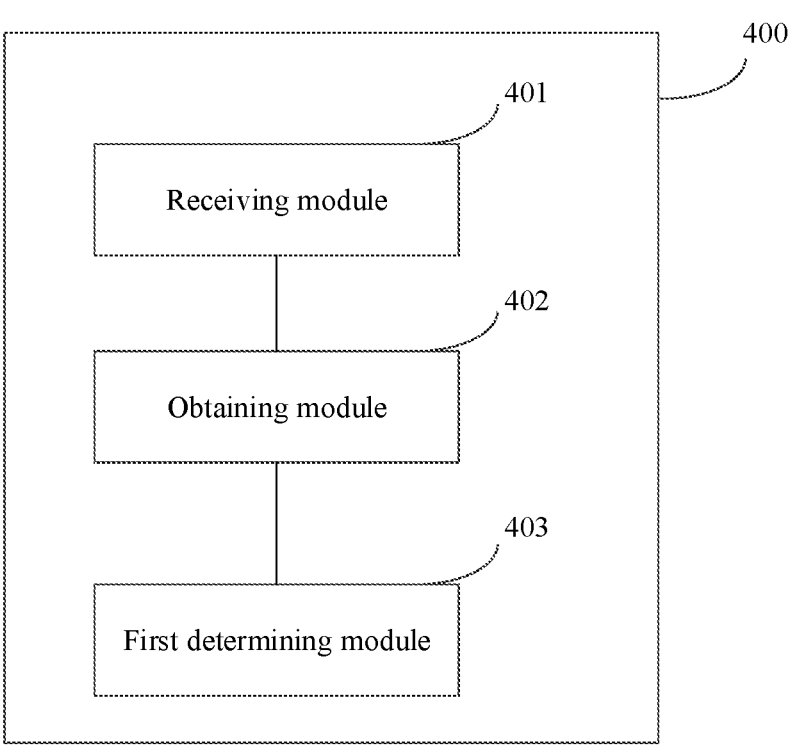

400

401

Receiving module

402

Obtaining module

403

First determining module

FIG. 4

PHYSICAL UPLINK CONTROL CHANNEL RESOURCE DETERMINING METHOD, TERMINAL, AND NETWORK-SIDE DEVICE

CROSS-REFERENCE TO RELATED APPLICATIONS

The present application is a continuation application of International Application No. PCT/CN2022/081653 filed on Mar. 18, 2022, which claims priority to Chinese Patent Application No. 202110297096.2, filed with the China National Intellectual Property Administration on Mar. 19, 2021 and entitled "PHYSICAL UPLINK CONTROL CHANNEL RESOURCE DETERMINING METHOD, TERMINAL, AND NETWORK-SIDE DEVICE", which is incorporated herein by reference in its entirety.

TECHNICAL FIELD

This application pertains to the field of wireless communications technologies, and specifically, relates to a physical uplink control channel resource determining method, a terminal, and a network-side device.

BACKGROUND

Before a radio resource control (RRC) connection is established, a base station is unable to configure physical uplink control channel (PUCCH) resource sets (PUCCH resource sets) for user equipment (UE, also referred to as terminal) via higher-layer RRC signaling, and therefore, uses protocol-predefined PUCCH resource sets. In addition, before RRC connection establishment, PUCCH is required by the UE only for reporting response information for RRC connection establishment signaling. Therefore, a PUCCH resource in the predefined PUCCH resource set needs to carry only 1-2 bits of response information, that is, the PUCCH resource in the predefined PUCCH resource set includes only PUCCH format 0 and format 1.

During access of UEs to a system, the base station can configure, via system information (System information block type 1, SIB1), a common PUCCH resource set for use by all UEs with RRC connection not yet established, where that set is one of pre-defined multiple PUCCH resource sets, which is cell-specific, and UEs in the cell determine their PUCCH resources based on the set before RRC connection establishment.

However, in the related art, there is no solution to determining of PUCCH resources in scenarios that PUCCH format 0 and/or PUCCH format 1 supports resource allocation of multiple physical resource blocks (PRB).

SUMMARY

Embodiments of this application provide a physical uplink control channel resource determining method, a terminal, and a network-side device.

According to a first aspect, a physical uplink control channel resource determining method is provided, including: receiving, by a terminal, system information, where the system information includes a first index, and the first index is used to indicate one target PUCCH resource set in multiple PUCCH resource sets that are predefined; obtaining, by the terminal, a first target parameter configured for the target PUCCH resource set, where the first target parameter includes one or more elements, and one element indicates one value of physical resource block (PRB) count corresponding to the target PUCCH resource set; and determining, by the terminal based on the first target parameter and a predefined configuration parameter for the target PUCCH resource set, a target PUCCH resource for use before radio resource control establishment.

According to a second aspect, a physical uplink control channel resource determining apparatus is provided, including: a receiving module, configured to receive system information, where the system information includes a first index, and the first index is used to indicate one target PUCCH resource set in multiple PUCCH resource sets that are predefined; an obtaining module, configured to obtain a first target parameter configured for the target PUCCH resource set, where the first target parameter includes one or more elements, and one element indicates one value of PRB count corresponding to the target PUCCH resource set; and a first determining module, configured to determine, based on the first target parameter and a predefined configuration parameter for the target PUCCH resource set, a target PUCCH resource for use before radio resource control establishment.

According to a third aspect, a physical uplink control channel resource determining method is provided, including: sending, by a network-side device, system information to a terminal, where the system information includes a first index, and the first index is used to indicate one target PUCCH resource set in multiple PUCCH resource sets that are predefined; and determining, by the network-side device based on a first target parameter configured for the target PUCCH resource set and a predefined configuration parameter for the target PUCCH resource set, a target PUCCH resource for use by the terminal before radio resource control establishment, where the first target parameter includes one or more elements, and one element indicates one value of PRB count corresponding to the target PUCCH resource set.

According to a fourth aspect, a physical uplink control channel resource determining apparatus is provided, including: a sending module, configured to send system information to a terminal, where the system information includes a first index, and the first index is used to indicate one target PUCCH resource set in multiple PUCCH resource sets that are predefined; and a second determining module, configured to determine, based on a first target parameter configured for the target PUCCH resource set and a predefined configuration parameter for the target PUCCH resource set, a target PUCCH resource for use by the terminal before radio resource control establishment, where the first target parameter includes one or more elements, and one element indicates one value of PRB count corresponding to the target PUCCH resource set.

According to a fifth aspect, a terminal is provided, where the terminal includes a processor, a memory, and a program or instructions stored in the memory and capable of running on the processor, and when the program or the instructions are executed by the processor, the steps of the method according to the first aspect are implemented.

According to a sixth aspect, a terminal is provided, including a processor and a communications interface, where the processor is configured to implement the steps of the method according to the first aspect during execution, and the communications interface is configured to communicate with a network-side device.

According to a seventh aspect, a network-side device is provided, where the network-side device includes a processor, a memory, and a program or instructions stored in the memory and capable of running on the processor, and when the program or the instructions are executed by the processor, the steps of the method according to the first aspect are implemented.

According to an eighth aspect, a network-side device is provided, including a processor and a communications interface, where the processor is configured to implement the steps of the method according to the first aspect during execution, and the communications interface is configured to communicate with a terminal.

According to a ninth aspect, a readable storage medium is provided, where a program or instructions are stored in the readable storage medium, and when the program or the instructions are executed by a processor, the steps of the method according to the first aspect are implemented, or the steps of the method according to the third aspect are implemented.

According to a tenth aspect, a chip is provided, where the chip includes a processor and a communications interface, the communications interface is coupled to the processor, and the processor is configured to run a program or instructions to implement the method according to the first aspect or implement the method according to the third aspect.

According to an eleventh aspect, a computer program/program product is provided, where the computer program/program product is stored in a non-volatile storage medium, and the program/program product is executed by at least one processor to implement the steps of the physical uplink control channel resource determining method according to the first aspect or the steps of the physical uplink control channel resource determining method according to the third aspect.

In the embodiments of this application, the terminal obtains the index of the target PUCCH resource set from the system information, determines a PUCCH resource set to which the target PUCCH resource belongs, and obtains the first target parameter configured for the target PUCCH resource set, where the first target parameter includes one or more elements, and one element indicates one value of PRB count corresponding to the target PUCCH resource set; and then the terminal can determine, based on the first target parameter and the predefined configuration parameter for the target PUCCH resource set, the target PUCCH resource for use before radio resource control establishment. With the technical solution provided in the embodiments of this application, multiple PRBs can be configured for the target PUCCH resource set, so as to resolve the problem of how to determine PUCCH resources in a case that multi-PRB resource allocation is supported for PUCCH format 0 and/or PUCCH format 1.

BRIEF DESCRIPTION OF DRAWINGS

FIG. 1 is a schematic diagram of a wireless communications system to which the embodiments of this application are applicable;

FIG. 2 is a flowchart of a PUCCH resource determining method according to an embodiment of this application;

FIG. 3 is a flowchart of another PUCCH resource determining method according to an embodiment of this application;

FIG. 4 is a schematic structural diagram of a PUCCH resource determining apparatus according to an embodiment of this application;

DESCRIPTION OF EMBODIMENTS

Figure 5:
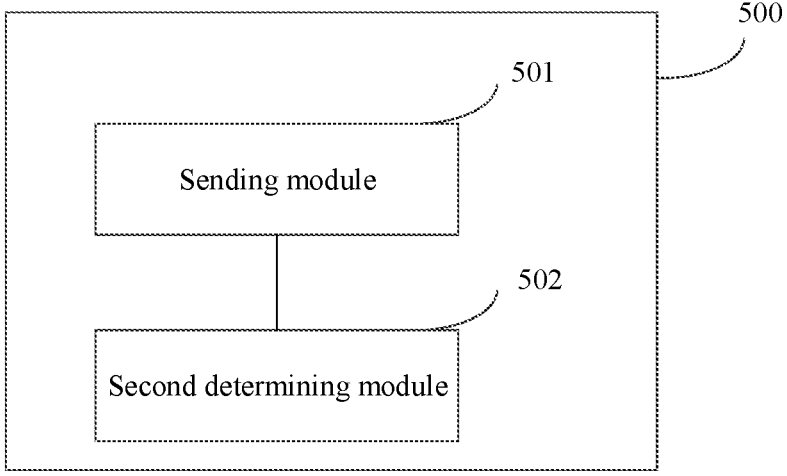
FIG. 5 is a schematic structural diagram of another PUCCH resource determining apparatus according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there are one or more first objects. In addition, in the specification and claims, "and/or" represents presence of at least one of connected objects, and the symbol "/" in this specification usually indicates an "or" relationship between associated objects.

It should be noted that technologies described in the embodiments of this application are not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communications system.

FIG. 1 is a schematic diagram of a wireless communications system to which the embodiments of this application are applicable. The wireless communications system includes a terminal 11 and a network-side device 12. The terminal 11 may also be referred to as a terminal device or user terminal (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like.

It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (WiFi) node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a PUCCH resource determining solution provided in the embodiments of this application by using some embodiments and application scenarios thereof with reference to the accompanying drawings.

FIG. 2 shows a flowchart of a PUCCH resource determining method according to an embodiment of this application. As shown in FIG. 2, the method 200 mainly includes the following steps:

S210: A terminal receives system information, where the system information includes a first index, and the first index is used to indicate one target PUCCH resource set in multiple PUCCH resource sets that are predefined.

In this embodiment of this application, multiple PUCCH resource sets including only PUCCH format 0 and PUCCH format 1 can be predefined, and each PUCCH resource set in the multiple PUCCH resource sets that are predefined includes multiple PUCCH resources, and multi-user multiplexing is implemented only through physical resource block (PRB) and cyclic shift. If interlace (interlace) is not supported, the UE enables a frequency hopping function by default. For example, multiple PUCCH resource sets including only PUCCH format 0 and format 1 are predefined in Table 1. Each PUCCH resource set in the multiple PUCCH resource sets that are predefined includes 16 PUCCH resources.

TABLE 1

| Index | PUCCH format | 1$^{st}$ symbol | The number of symbols | BWP resource block offset $RB_{BWP}^{offset}$ | Cyclic shift set |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

When the terminal accesses a system, the network-side device (for example, a base station) may indicate the first index in pucch-ResourceCommon of the system information (for example, SIB1), and configures one common PUCCH resource set for the terminal with RRC connection not yet established. The PUCCH resource set may be cell-specific, corresponding to a specific row in Table 1. The PUCCH resource set is a PUCCH resource set before a terminal-specific PUCCH resource is configured, and may be referred to as a common PUCCH resource set.

S212: The terminal obtains a first target parameter configured for the target PUCCH resource set, where the first target parameter includes one or more elements, and one element indicates one value of physical resource block (PRB) count corresponding to the target PUCCH resource set.

In this embodiment of this application, one or more elements may be configured for each PUCCH resource set in the multiple PUCCH resource sets that are predefined, and each element indicates a candidate value of PRB count in the PUCCH resources of the PUCCH resource set.

That is, in this embodiment of the application, each PUCCH resource set in the multiple PUCCH resource sets that are predefined corresponds to one value of PRB count (that is, one element), and the PRB count is related to a PUCCH format and/or a time domain symbol length of PUCCH. Alternatively, each PUCCH resource set in the multiple PUCCH resource sets that are predefined may correspond to multiple values of PRB count (that is, multiple elements).

In this embodiment of this application, the value of each element may be obtained through scaling on a subcarrier spacing (SCS). For example, one element with a value of 16 is configured for a 120 kHz SCS, and this element is scaled to 4 and 2 for 480 kHz and 960 kHz SCSs respectively.

In a possible implementation, the terminal may obtain the first target parameter from the system information. That is, in the possible implementation, the network-side device may carry a PRB count corresponding to the target PUCCH resource set that corresponds to the first index (that is, the number of PRBs contained in the PUCCH resources of the target PUCCH resource set) through the system information.

In a possible implementation, the first target parameter may alternatively be used as a predefined configuration parameter for the target PUCCH resource set, that is, a definition of PRB count is added to the multiple PUCCH resource sets that are predefined. For example, the multiple PUCCH resource sets that are predefined can be defined in a manner shown in Table 2, and each PUCCH resource set includes a new predefined configuration parameter: PRB count set, where the set includes one or more elements, and a value of each element represents one possible value of PRB count included in the PUCCH resources of the PUCCH resource set.

TABLE 2

| Index | PUCCH format | 1$^{st}$ symbol | The number of symbols | BWP resource block offset $RB_{BWP}^{offset}$ | Cyclic shift set | PRB count set |
|---|---|---|---|---|---|---|
| 0 | 0 | 12 | 2 | 0 | {0, 3} | {1,2,4,10} |
| 1 | 0 | 12 | 2 | 0 | {0, 4, 8} | {1,2,4,10} |
| 2 | 0 | 12 | 2 | 3 | {0, 4, 8 } | {1,2,4,10} |
| 3 | 1 | 10 | 4 | 0 | {0, 6} | {1,2,4,8} |

TABLE 2-continued

| Index | PUCCH format | $1^{st}$ symbol | The number of symbols | BWP resource block offset $RB_{BWP}^{offset}$ | Cyclic shift set | PRB count set |
|---|---|---|---|---|---|---|
| 4 | 1 | 10 | 4 | 0 | {0, 3, 6, 9} | {1,2,4,8} |
| 5 | 1 | 10 | 4 | 2 | {0, 3, 6, 9} | {1,2,4,8} |
| 6 | 1 | 10 | 4 | 4 | {0, 3, 6, 9} | {1,2,4,8} |
| 7 | 1 | 4 | 10 | 0 | {0, 6} | {1,2,4,8} |
| 8 | 1 | 4 | 10 | 0 | {0, 3, 6, 9} | {1,2,4,8} |
| 9 | 1 | 4 | 10 | 2 | {0, 3, 6, 9} | {1,2,4,8} |
| 10 | 1 | 4 | 10 | 4 | {0, 3, 6, 9} | {1,2,4,8} |
| 11 | 1 | 0 | 14 | 0 | {0, 6} | {1,2,4,8} |
| 12 | 1 | 0 | 14 | 0 | {0, 3, 6, 9} | {1,2,4,8} |
| 13 | 1 | 0 | 14 | 2 | {0, 3, 6, 9} | {1,2,4,8} |
| 14 | 1 | 0 | 14 | 4 | {0, 3, 6, 9} | {1,2,4,8} |
| 15 | 1 | 0 | 14 | $\lfloor N_{BWP}^{size}/4 \rfloor$ | {0, 3, 6, 9} | {1,2,4,8} |

S214: The terminal determines, based on the first target parameter and a predefined configuration parameter for the target PUCCH resource set, a target PUCCH resource for use before radio resource control establishment.

In a specific application, determining the target PUCCH resource means determining the PRBs included in the target PUCCH resource. Therefore, the target PUCCH resource can be determined by determining the number of PRB s contained in the target PUCCH resource and a starting PRB index of the target PUCCH resource. Therefore, in a possible implementation, S214 may include: the terminal determines, based on the first target parameter, the number of PRBs contained in the target PUCCH resource; and the terminal determines, based on the first target parameter and the predefined configuration parameter for the target PUCCH resource set, the target PUCCH resource for use before radio resource control establishment.

In practical applications, in addition to determining of the number of PRBs contained in the target PUCCH resource and the starting PRB index, a cyclic shift of the target PUCCH resource may be also determined during determining of the target PUCCH resource.

If interlace is not supported, the terminal enables a frequency hopping function by default. Therefore, the starting PRB index includes a starting PRB index of the first hop and a starting PRB index of the second hop.

In a possible implementation, the starting PRB index of the first hop is not related to a bandwidth of an initial uplink bandwidth part (BWP) in which the terminal is located, but is related to the number of PRBs contained in the target PUCCH resource. Therefore, in this possible implementation, that the terminal determines the starting PRB index of the target PUCCH resource based on the first target parameter and the predefined configuration parameter for the target PUCCH resource set may include: in a case that the first target parameter includes one element, the terminal determines a starting PRB index of the first hop in the target PUCCH resource based on a third target parameter, and determines a starting PRB index of the second hop in the target PUCCH resource based on a fourth target parameter. The third target parameter includes: a BWP PRB offset $$RB_{BWP}^{offset}$$

of the target PUCCH resource set (for example, $$RB_{BWP}^{offset}$$

in Table 1 and Table 2 indicates an offset of a PRB of the target PUCCH resource in the target PUCCH resource set relative to a minimum PRB index of the BWP in which the terminal is located), a second index, the number of elements in a cyclic shift set (that is, a cyclic shift set in Table 1 and Table 2) of the target PUCCH resource set, and the elements included in the first target parameter, where the second index is an index of the target PUCCH resource in the target PUCCH resource set. The fourth target parameter includes: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements included in the first target parameter.

In the foregoing possible implementation, the second index $r_{PUCCH}$ may be used for determining the target PUCCH resource, $0 \le r_{PUCCH} \le 15$, and $$r_{PUCCH} = \left\lfloor \frac{2 \cdot n_{CCE,0}}{N_{CCE}} \right\rfloor + 2 \cdot \Delta_{PRI},$$

where $\Delta_{PRI}$ is a PUCCH resource index indication field in downlink control information (DCI) received by the UE, $N_{CCE}$ is the number of control channel elements (CCE) of a control resource set (CORESET) of a physical downlink control channel (PDCCH) in which the DCI received by the UE is located, and $n_{CCE,0}$ is the $1^{st}$ CCE index of PDCCH. Alternatively, in another possible implementation of this embodiment of this application, the starting PRB index of the second hop is not related to the bandwidth of the initial uplink BWP in which the terminal is located, but is related to the number of PRBs contained in the target PUCCH resource. In this case, that the terminal determines the starting PRB index of the target PUCCH resource based on the first target parameter and the predefined configuration parameter for the target PUCCH resource set may include: in a case that the first target parameter includes one element, the terminal determines a starting PRB index of the first hop in the target PUCCH resource based on a fourth target parameter, and determines a starting PRB index of the second hop in the target PUCCH resource based on a third target parameter.

For example, if $\lfloor r_{PUCCH}/8 \rfloor = 0$, the UE determines that the PRB index of the first hop is $$(RB_{BWP}^{offset} + \lfloor r_{PUCCH}/N_{CS} \rfloor) * (PRB_{number})$$

and the PRB index of the second hop is $$N_{BWP}^{size} - 1 - (RB_{BWP}^{offset} - \lfloor r_{PUCCH}/N_{CS} \rfloor) * (PRB_{number}).$$

$$RB_{BWP}^{offset} \text{ is } RB_{BWP}^{offset}$$

of the target PUCCH resource set, for example, $$RB_{BWP}^{offset}$$

corresponding to the target PUCCH resource set in Table 1 or Table 2. $N_{CS}$ is the total number of cyclic shift sequences in the cyclic shift sequence set corresponding to the target PUCCH resource set, that is, the total number of cyclic shift sequences in the cyclic shift sequence set in the last column of a row corresponding to the target PUCCH resource set in Table 1 or Table 2, $$N_{BWP}^{size}$$

is a bandwidth of the initial uplink BWP in which the terminal is located, and $PRB_{number}$ is the number of PRBs contained in the target PUCCH resource, that is, a value of the one element in the first target parameter.

However, if $\lfloor r_{PUCCH}/8 \rfloor = 1$, the UE determines that the PRB index of the first hop is $$N_{BWP}^{size} - 1 - \left(RB_{BWP}^{offset} - \lfloor r_{PUCCH}/N_{CS} \rfloor\right) * (PRB_{number})$$

and the PRB index of the second hop is $$\left(RB_{BWP}^{offset} + \lfloor r_{PUCCH}/N_{CS} \rfloor\right) * (PRB_{number}).$$

$N_{CS}$ is the total number of cyclic shift sequences in the cyclic shift sequence set corresponding to the target PUCCH resource set, that is, the total number of cyclic shift sequences in the cyclic shift sequence set in the last column of a row corresponding to the target PUCCH resource set in Table 1 or Table 2.

For example, assuming that the predefined configuration parameters of each PUCCH resource set in the multiple PUCCH resource sets that are predefined are shown in Table 1, the system information indicates that a row index (that is, the first index) of the target PUCCH resource set in Table 1 is 0, the value of the one element in the first target parameter included in the received system information is 4, that is, indicating that the number of PRBs contained in the target PUCCH resource is 4, or one configuration parameter that indicates the number of PRBs corresponding to the PUCCH resource set may be added to Table 1, where there is only one configuration parameter for the target PUCCH resource set, with a value of 4. As calculated according to the above description, target PUCCH resources corresponding to different $r_{PUCCH}$ are obtained as shown in Table 3, where $$N = N_{BWP}^{size} - 1.$$

TABLE 3

| $r_{PUCCH}$ | starting PRB index PRB_index of the first hop | starting PRB index PRB_index of the second hop | Cyclic shift CS |
|---|---|---|---|
| 0 | 0 | N − 0 | 0 |
| 1 | 0 | N − 0 | 3 |
| 2 | 1 * 4 | N − 1 * 4 | 0 |
| 3 | 1 * 4 | N − 1 * 4 | 3 |
| 4 | 2 * 4 | N − 2 * 4 | 0 |
| 5 | 2 * 4 | N − 2 * 4 | 3 |
| 6 | 3 * 4 | N − 3 * 4 | 0 |
| 7 | 3 * 4 | N − 3 * 4 | 3 |
| 8 | N − 0 | 0 | 0 |
| 9 | N − 0 | 0 | 3 |
| 10 | N − 1 * 4 | 1 * 4 | 0 |
| 11 | N − 1 * 4 | 1 * 4 | 3 |
| 12 | N − 2 * 4 | 2 * 4 | 0 |
| 13 | N − 2 * 4 | 2 * 4 | 3 |
| 14 | N − 3 * 4 | 3 * 4 | 0 |
| 15 | N − 3 * 4 | 3 * 4 | 3 |

An index of the cyclic shift (CS) of the target PUCCH resource in the cyclic shift set is $r_{PUCCH}$ mod $N_{CS}$.

If the first target parameter includes multiple elements, that is, one target PUCCH resource set corresponds to multiple candidate values, and each candidate value indicates one PRB count. In this case, the terminal needs to determine, based on the first target parameter, the number of PRBs contained in the target PUCCH resource. In a possible implementation, determining, based on the first target parameter, the number of PRBs contained in the target PUCCH resource may include: the terminal determines a target element from the multiple elements based on a second target parameter, where the second target parameter includes: a second index, an SCS on an initial uplink BWP in which the terminal is located, the number of elements in a cyclic shift set of the target PUCCH resource set, and a quantity of the multiple elements, and the second index is an index of the target PUCCH resource in the target PUCCH resource set; and determines that the number of PRBs contained in the target PUCCH resource is equal to a value indicated by the target element.

The second index is the foregoing second index $r_{PUCCH}$ which can be determined by using the foregoing method, and details are not repeated herein.

In a possible implementation, different PRB count sets may be configured according to different SCSs, that is, the multiple elements included in the first target parameter may be divided into multiple sets, different sets being configured for different SCSs. Therefore, a set corresponding to the target PUCCH resource can be determined based on the SCS of the initial uplink BWP in which the terminal is located. Certainly, the SCSs may alternatively not be distinguished, and all SCSs use a same set.

For example, using the multiple PUCCH resource sets that are predefined shown in Table 2 as an example, when the system information (such as SIB1) indicates that the row index of the target PUCCH resource set in Table 2 is 0, the index of the target element (that is, the target value of PRB count) corresponding to the target PUCCH resource in the PRB count set in Table 2 is:

$$\lfloor r_{PUCCH}/N_{CS} \rfloor \text{ mod } N_{PRB}, \text{ where}$$

$N_{PRB}$ is the number of elements included in the PRB count set of the target PUCCH resource set, for example, the number of elements included in the first target parameter.

In a possible implementation, the starting PRB index of the second hop is not related to the bandwidth of the initial uplink BWP in which the terminal is located, but is related to the number of PRBs contained in the target PUCCH resource. In this case, that the terminal determines the starting PRB index of the target PUCCH resource based on the first target parameter and the predefined configuration parameter for the target PUCCH resource set may include: in a case that the first target parameter includes multiple elements, the terminal determines a starting PRB index of the first hop in the target PUCCH resource based on a fifth target parameter, and determines a starting PRB index of the second hop in the target PUCCH resource based on a sixth target parameter.

The fifth target parameter includes: a BWP resource block offset $$RB_{BWP}^{offset}$$

of the target PUCCH resource set, a second index, the number of elements in a cyclic shift set of the target PUCCH resource set, and elements included in the first target parameter, where the second index is an index of the target PUCCH resource in the target PUCCH resource set; and the sixth target parameter includes: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements included in the first target parameter.

Alternatively, in another possible implementation, the starting PRB index of the second hop is not related to the bandwidth of the initial uplink BWP in which the terminal is located, but is related to the number of PRBs contained in the target PUCCH resource. In this case, that the terminal determines the starting PRB index of the target PUCCH resource based on the first target parameter and the predefined configuration parameter for the target PUCCH resource set may include: in a case that the first target parameter includes multiple elements, the terminal determines a starting PRB index of the first hop in the target PUCCH resource based on a sixth target parameter, and determines a starting PRB index of the second hop in the target PUCCH resource based on a fifth target parameter.

For example, if $\lfloor r_{PUCCH}/8 \rfloor = 0$, the UE determines that the PRB index of the first hop is $$RB_{BWP}^{offset} + \sum_{0}^{\lfloor r_{PUCCH}/N_{CS} \rfloor - 1} (PRB_{number-index})/N_{CS},$$

and the PRB index of the second hop is $$N_{BWP}^{size} - 1 - RB_{BWP}^{offset} - \sum_{0}^{\lfloor r_{PUCCH}/N_{CS} \rfloor - 1} (PRB_{number-index})/N_{CS},$$

where $N_{CS}$ is a total number of cyclic shift sequences in the cyclic shift sequence set in the last column of the table.

If $\lfloor r_{PUCCH}/8 \rfloor = 1$, the UE determines that the PRB index of the first hop is $$N_{BWP}^{size} - 1 - RB_{BWP}^{offset} - \sum_{0}^{\lfloor r_{PUCCH}/N_{CS} \rfloor - 1} (PRB_{number-index})/N_{CS},$$

and the PRB index of the second hop is $$RB_{BWP}^{offset} + \sum_{0}^{\lfloor r_{PUCCH}/N_{CS} \rfloor - 1} (PRB_{number-index})/N_{CS},$$

where $N_{CS}$ is a total number of cyclic shift sequences in the cyclic shift sequence set in the last column of the table.

A variable in the summation formula is index, and $PRB_{number-index}$ corresponds to the index-th element in the PRB count set. That is, $$\sum_{0}^{\lfloor r_{PUCCH}/N_{CS} \rfloor - 1} (PRB_{number-index})$$

indicates a sum of $PRB_{number-index}$ corresponding to indexes of 0 to $\lfloor r_{PUCCH}/N_{CS} \rfloor - 1$, that is, a sum of values of elements with indexes of 0 to $\lfloor r_{PUCCH}/N_{CS} \rfloor - 1$ in the PRB count set.

For example, using the multiple PUCCH resource sets that are predefined shown in Table 2 as an example, when the system information (such as SIB1) indicates that the row index of the target PUCCH resource set in Table 2 is 0, as calculated according to the above description, obtained target PUCCH resources corresponding to different $r_{PUCCH}$ are shown in Table 4, where $$N = N_{BWP}^{size} - 1.$$

TABLE 4

| $r_{PUCCH}$ | starting PRB index PRB_index of the first hop | starting PRB index PRB_index of the second hop | Cyclic shift CS | PRB count |
|---|---|---|---|---|
| 0 | 0 | N − 0 | 0 | 1 |
| 1 | 0 | N − 0 | 3 | 1 |
| 2 | 1 | N − 1 | 0 | 2 |
| 3 | 1 | N − 1 | 3 | 2 |
| 4 | 1 + 2 | N − 2 − 1 | 0 | 4 |
| 5 | 1 + 2 | N − 2 − 1 | 3 | 4 |
| 6 | 1 + 2 + 4 | N − 4 − 2 − 1 | 0 | 10 |
| 7 | 1 + 2 + 4 | N − 4 − 2 − 1 | 3 | 10 |
| 8 | N − 0 | 0 | 0 | 1 |
| 9 | N − 0 | 0 | 3 | 1 |
| 10 | N − 1 | 1 | 0 | 2 |
| 11 | N − 1 | 1 | 3 | 2 |
| 12 | N − 2 − 1 | 1 + 2 | 0 | 4 |
| 13 | N − 2 − 1 | 1 + 2 | 3 | 4 |
| 14 | N − 4 − 2 − 1 | 1 + 2 + 4 | 0 | 10 |
| 15 | N − 4 − 2 − 1 | 1 + 2 + 4 | 3 | 10 |

An index of the cyclic shift CS of the target PUCCH resource in the cyclic shift set is $r_{PUCCH} \bmod N_{CS}$.

In a possible implementation in this embodiment of this application, the first target parameter may further include: indication information indicating a time domain resource. That is, in this embodiment of this application, the PRBs of the target PUCCH resource may be distributed on different time domain resources.

In a possible implementation, that the terminal obtains the first target parameter configured for the target PUCCH resource set may further include: the terminal obtains the indication information from the predefined configuration parameter for the target PUCCH resource set. That is, in this possible implementation, when multiple PUCCH resource sets are predefined, one predefined configuration parameter may be added for each PUCCH resource set to indicate a time domain resource.

In a possible implementation, the indication information indicates multiple time domain positions and/or multiple time domain orthogonal cover codes (OCC).

In a possible implementation, the determining a target physical uplink control channel (PUCCH) resource for use before radio resource control establishment further includes: the terminal determines one time domain position from the multiple time domain positions based on a second index, and determines a time domain resource of the target PUCCH resource based on the determined time domain position, where the second index is an index of the target PUCCH resource in the target PUCCH resource set.

The second index is the foregoing second index $r_{PUCCH}$. For a specific determining manner, reference may be made to the foregoing method, and details are not repeated herein.

For example, multiple start length indicator value (SLIV) candidate combinations are configured for the time domain resources of each PUCCH resource set, the time domain resource of the target PUCCH resource can be indicated by $r_{PUCCH}$.

For example, the $1^{st}$ symbol and the number of symbols in Table 1 are combined into an SLIV candidate combination, and each candidate combination includes two parameters: a position of the $1^{st}$ symbol and the number of symbols. One PUCCH resource set may correspond to multiple SLIV candidate combinations, and a candidate combination of the target PUCCH resource can be obtained based on $r_{PUCCH}$. For example, if two SLIV candidate combinations (12,2) and (10,2) are included and $\lfloor r_{PUCCH}/8 \rfloor = 0$, SLIV_index 0, that is, the time domain resource of the target PUCCH resource is the first SLIV candidate combination (12,2); if $\lfloor r_{PUCCH}/8 \rfloor = 1$, SLIV index=1, that is, the time domain resource of the target PUCCH resource is the second SLIV candidate combination (10,2).

For example, assuming that the row index of the target PUCCH resource set indicated by the system information is 0, the value of the one element included in the first target parameter is 4, and part of configuration parameters of the target PUCCH resource set with the row index of 0 are shown in Table 5, target PUCCH resources corresponding to different $r_{PUCCH}$ that are obtained through calculation according to the foregoing solution are shown in Table 6.

TABLE 5

| Index | PUCCH format | ($1^{st}$ symbol, the number of symbols) | BWP resource block offset $RB_{BWP}^{offset}$ | Cyclic shift set |
|---|---|---|---|---|
| 0 | 0 | (12,2), (10,2) | 0 | {0, 3} |

TABLE 6

| $r_{PUCCH}$ | starting PRB index PRB_index of the first hop | starting PRB index PRB_index of the second hop | Cyclic shift CS | SLIV candidate combination |
|---|---|---|---|---|
| 0 | 0 | N − 0 | 0 | (12, 2) |
| 1 | 0 | N − 0 | 3 | (12, 2) |
| 2 | 1 * 4 | N − 1 * 4 | 0 | (12, 2) |

TABLE 6-continued

| $r_{PUCCH}$ | starting PRB index PRB_index of the first hop | starting PRB index PRB_index of the second hop | Cyclic shift CS | SLIV candidate combination |
|---|---|---|---|---|
| 3 | 1 * 4 | N − 1 * 4 | 3 | (12, 2) |
| 4 | 2 * 4 | N − 2 * 4 | 0 | (12, 2) |
| 5 | 2 * 4 | N − 2 * 4 | 3 | (12, 2) |
| 6 | 3 * 4 | N − 3 * 4 | 0 | (12, 2) |
| 7 | 3 * 4 | N − 3 * 4 | 3 | (12, 2) |
| 8 | 0 | N − 0 | 0 | (10, 2) |
| 9 | 0 | N − 0 | 3 | (10, 2) |
| 10 | 1 * 4 | N − 1 * 4 | 0 | (10, 2) |
| 11 | 1 * 4 | N − 1 * 4 | 3 | (10, 2) |
| 12 | 2 * 4 | N − 2 * 4 | 0 | (10, 2) |
| 13 | 2 * 4 | N − 2 * 4 | 3 | (10, 2) |
| 14 | 3 * 4 | N − 3 * 4 | 0 | (10, 2) |
| 15 | 3 * 4 | N − 3 * 4 | 3 | (10, 2) |

Alternatively, in another possible implementation, the indication information indicates multiple time domain orthogonal cover codes (OCC). That is, a time domain OCC set is configured for time domain resources of each PUCCH resource set. For example, in Table 7, one predefined configuration parameter being OCC index is added for each PUCCH resource set.

TABLE 7

| Index | PUCCH format | $1^{st}$ symbol | The number of symbols | BWP resource block offset $RB_{BWP}^{offset}$ | Cyclic shift set | OCC index |
|---|---|---|---|---|---|---|
| 0 | 0 | 12 | 2 | 0 | {0, 3} | (0,1) |

In a possible implementation, the determining the target PUCCH resource for use before radio resource control establishment may further include: the terminal determines one time domain orthogonal cover code from the multiple time domain orthogonal cover codes based on a second index, and determines a time domain resource of the target PUCCH resource based on the determined time domain orthogonal cover code.

For example, in Table 7, there are two time domain orthogonal cover codes. If $\lfloor r_{PUCCH}/8 \rfloor = 0$, occ_index=0, that is, the target PUCCH resource corresponds to the first time domain orthogonal cover code; or if $\lfloor r_{PUCCH}/8 \rfloor = 1$, occ_index=1, that is, the target PUCCH resource corresponds to the second time domain orthogonal cover code.

For example, if the multiple PUCCH resource sets that are predefined use configuration parameters shown in Table 8, target PUCCH resources obtained according to the above solution are shown in Table 9.

TABLE 8

| Index | PUCCH format | $1^{st}$ symbol | The number of symbols | BWP resource block offset $RB_{BWP}^{offset}$ | Cyclic shift set | PRB count set | OCC index |
|---|---|---|---|---|---|---|---|
| 0 | 0 | 12 | 2 | 0 | {0, 3} | {1,2,4,10} | (0,1) |

TABLE 9

| $r_{PUCCH}$ | starting PRB index PRB_index of the first hop | starting PRB index PRB_index of the second hop | Cyclic shift CS | PRB count | OCC index |
|---|---|---|---|---|---|
| 0 | 0 | N − 0 | 0 | 1 | 0 |
| 1 | 0 | N − 0 | 3 | 1 | 0 |
| 2 | 1 | N − 1 | 0 | 2 | 0 |
| 3 | 1 | N − 1 | 3 | 2 | 0 |
| 4 | 1 + 2 | N − 2 − 1 | 0 | 4 | 0 |
| 5 | 1 + 2 | N − 2 − 1 | 3 | 4 | 0 |
| 6 | 1 + 2 + 4 | N − 4 − 2 − 1 | 0 | 10 | 0 |
| 7 | 1 + 2 + 4 | N − 4 − 2 − 1 | 3 | 10 | 0 |
| 8 | N − 0 | 0 | 0 | 1 | 1 |
| 9 | N − 0 | 0 | 3 | 1 | 1 |
| 10 | N − 1 | 1 | 0 | 2 | 1 |
| 11 | N − 1 | 1 | 3 | 2 | 1 |
| 12 | N − 2 − 1 | 1 + 2 | 0 | 4 | 1 |
| 13 | N − 2 − 1 | 1 + 2 | 3 | 4 | 1 |
| 14 | N − 4 − 2 − 1 | 1 + 2 + 4 | 0 | 10 | 1 |
| 15 | N − 4 − 2 − 1 | 1 + 2 + 4 | 3 | 10 | 1 |

In a possible implementation, before the determining a time domain resource of the target PUCCH resource, the method further includes one of the following:

(1) The terminal determines, according to an indication of the system information, that the time domain resource of the target PUCCH resource needs to be determined according to the indication of the indication information. That is, the network-side device indicates that the terminal needs to determine the time domain resource of the target PUCCH resource according to the indication information of the time domain resource, so as to implement consistent understanding between the network-side device and the terminal.

(2) The terminal determines, based on a bandwidth and an SCS of an initial uplink BWP in which the terminal is located, that the time domain resource of the target PUCCH resource needs to be determined according to the indication of the indication information.

For example, the terminal may first obtain, based on the bandwidth and the SCS of the initial uplink BWP, a total number of PRBs contained in the uplink BWP. In a specific application, a radio frequency transmit power cannot exceed a maximum equivalent isotropically radiated power (ETRP), and the radio frequency transmit power can be obtained from a spectral power density (PSD) and a bandwidth occupied by the PUCCH. Different regulations on PSD and maximum ETRP are imposed in different regions. According to the ETRP and PSD regulation requirements in different regions, the number of PRBs required for the PUCCH resource to reach the maximum ETRP transmit power, is shown in Table 10.

TABLE 10

| SCS | RB (400 MHz) | 1 RB/MHz | RB_num (EIPR 40, PSD 23) | RB_num (EIRP 43, PSD 13) | RB_num (EIRP 27, PSD 13) |
|---|---|---|---|---|---|
| 120 | 256 | 1.44 | 35 | 695 | 18 |
| 480 | 64 | 5.76 | 9 | 174 | 5 |
| 960 | 32 | 11.52 | 5 | 87 | 3 |

Then, based on the number of PRBs required for each PUCCH resource and the total number of PRBs, it is determined that if the time domain resource of the target PUCCH resource is not determined according to the indication of the indication information, PRB resources of different PUCCH resources are unable to satisfy orthogonality, and it is determined that the time domain resource of the target PUCCH resource needs to be determined according to the indication of the indication information. For example, in Table 10, for the PUCCH resource sets with row indexes of 0, 3, 7, and 10 in Table 1, eight PRBs need to be occupied. If it is necessary to ensure orthogonality between PRB resources of different cells, for example, for EIRP=40 dBm, PSD=23 MHz/dBm, and SCS=480 kHz, at least 72 PRBs are required, which exceeds the BWP bandwidth size. Therefore, the terminal determines that the time domain resource of the target PUCCH resource needs to be determined according to the indication of the indication information.

(3) In a case that the bandwidth of the initial uplink BWP is less than a threshold bandwidth and/or the SCS is greater than a threshold, it is determined that the time domain resource of the target PUCCH resource needs to be determined according to the indication of the indication information. That is, if the bandwidth of the initial uplink BWP in which the terminal is located is less than the threshold bandwidth, multiple time domain positions need to be used, and the time domain resource of the target PUCCH resource may be determined according to the indication information for the time domain resource; or, if the SCS of the initial uplink BWP in which the terminal is located is greater than the threshold, multiple time domain positions need to be used, and the time domain resource of the target PUCCH resource may be determined according to the indication information for the time domain resource.

In the technical solution provided in this embodiment of this application, a parameter indicating the number of PRBs for the predefined common PUCCH resource set is configured, so that the target PUCCH resource can be determined in a case that multi-PRB resource allocation is supported for PUCCH format 0 and/or PUCCH format 1. In addition, a configuration parameter indicating the time domain resource is also configured for the common PUCCH resource set, so as to ensure better frequency-domain orthogonality of the predefined common PUCCH resources in a case of insufficient BWP bandwidth.

FIG. 3 shows a flowchart of another PUCCH resource determining method according to an embodiment of this application. As shown in FIG. 3, the method 300 mainly includes the following steps:

S310: A network-side device sends system information to a terminal, where the system information includes a first index, and the first index is used to indicate one target PUCCH resource set in multiple PUCCH resource sets that are predefined.

In this embodiment of this application, the network-side device may send, based on a specific cell, the system information to UE with RRC connection not yet established in the cell.

The system information is the same as the system information in the method 200. For details, refer to the description in the method 200.

In a possible implementation, the predefined configuration parameter for the target PUCCH resource set includes the first target parameter.

In a possible implementation, the system information further includes the first target parameter.

S312: The network-side device determines, based on a first target parameter configured for the target PUCCH resource set and a predefined configuration parameter for the target PUCCH resource set, a target PUCCH resource for use by the terminal before radio resource control establishment, where the first target parameter includes one or more elements, and one element indicates one value of PRB count corresponding to the target PUCCH resource set.

In this embodiment of this application, the network-side device may determine the target PUCCH resource by using each possible implementation of the terminal described in the method 200. For details, refer to the description in the method 200, which is not repeated herein.

In a possible implementation, that the network-side device determines, based on the first target parameter configured for the target PUCCH resource set and the predefined configuration parameter for the target PUCCH resource set, the target PUCCH resource for use by the terminal before radio resource control establishment may include:

determining, by the network-side device based on the first target parameter, the number of PRBs contained in the target PUCCH resource; and determining, by the network-side device, a starting PRB index of the target PUCCH resource based on the first target parameter and the predefined configuration parameter for the target PUCCH resource set.

In a possible implementation, that the network-side device determines, based on the first target parameter, the number of PRBs contained in the target PUCCH resource may include:

if the first target parameter includes multiple elements, determining, by the network-side device, a target element from the multiple elements based on a second target parameter, where the second target parameter includes: a second index, a subcarrier spacing (SCS) on an initial uplink bandwidth part (BWP) in which the terminal is located, the number of elements in a cyclic shift set of the target PUCCH resource set, and a quantity of the multiple elements, and the second index is an index of the target PUCCH resource in the target PUCCH resource set; and determining that the number of PRBs contained in the target PUCCH resource is equal to a value indicated by the target element.

In a possible implementation, that the network-side device determines the starting PRB index of the target PUCCH resource based on the first target parameter and the predefined configuration parameter for the target PUCCH resource set may include:

in a case that the first target parameter includes one element, determining, by the network-side device, a starting PRB index of the first hop in the target PUCCH resource based on a third target parameter, and determining a starting PRB index of the second hop in the target PUCCH resource based on a fourth target parameter; or in a case that the first target parameter includes one element, determining, by the network-side device, a starting PRB index of the first hop in the target PUCCH resource based on a fourth target parameter, and determining a starting PRB index of the second hop in the target PUCCH resource based on a third target parameter; where the third target parameter includes: a BWP resource block offset $$RB_{BWP}^{offset}$$

of the target PUCCH resource set, a second index, the number of elements in a cyclic shift set of the target PUCCH resource set, and the elements included in the first target parameter, where the second index is an index of the target PUCCH resource in the target PUCCH resource set; and the fourth target parameter includes: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements included in the first target parameter.

In a possible implementation, that the network-side device determines the starting PRB index of the target PUCCH resource based on the first target parameter and the predefined configuration parameter for the target PUCCH resource set may include:

in a case that the first target parameter includes multiple elements, determining, by the network-side device, a starting PRB index of the first hop in the target PUCCH resource based on a fifth target parameter, and determining a starting PRB index of the second hop in the target PUCCH resource based on a sixth target parameter; or in a case that the first target parameter includes multiple elements, determining, by the network-side device, a starting PRB index of the first hop in the target PUCCH resource based on a sixth target parameter, and determining a starting PRB index of the second hop in the target PUCCH resource based on a fifth target parameter; where the fifth target parameter includes: a BWP resource block offset $$RB_{BWP}^{offset}$$

of the target PUCCH resource set, a second index, the number of elements in a cyclic shift set of the target PUCCH resource set, and elements included in the first target parameter, where the second index is an index of the target PUCCH resource in the target PUCCH resource set; and the sixth target parameter includes: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements included in the first target parameter.

In a possible implementation, the first target parameter may further include: indication information indicating a time domain resource.

In a possible implementation, the predefined configuration parameter for the target PUCCH resource set includes the indication information.

In a possible implementation, the indication information indicates multiple time domain positions; or the indication information indicates multiple time domain orthogonal cover codes.

In a possible implementation, the determining a target PUCCH resource for use by the terminal before radio resource control establishment further includes:

determining, by the network-side device, one time domain position from the multiple time domain positions based on a second index, and determining a time domain resource of the target PUCCH resource based on the determined time domain position, where the second index is an index of the target PUCCH resource in the target PUCCH resource set; or determining, by the network-side device, one time domain orthogonal cover code from the multiple time domain orthogonal cover codes based on a second index, and determining a time domain resource of the target PUCCH resource based on the determined time domain orthogonal cover code.

In a possible implementation, before the determining a time domain resource of the target PUCCH resource, the method further includes one of the following:

indicating, by the network-side device, in the system information that the time domain resource of the target PUCCH resource needs to be determined according to an indication of the indication information;

determining, by the network-side device based on a bandwidth and an SCS of an initial uplink BWP in which the terminal is located, that the time domain resource of the target PUCCH resource needs to be determined according to the indication of the indication information; and in a case that the bandwidth of the initial uplink BWP is less than a threshold bandwidth and/or the SCS is greater than a threshold, determining that the time domain resource of the target PUCCH resource needs to be determined according to the indication of the indication information.

In a possible implementation, that the network-side device determines, based on the bandwidth and the SCS of the initial uplink BWP in which the terminal is located, that the time domain resource of the target PUCCH resource needs to be determined according to the indication of the indication information includes:

obtaining, based on the bandwidth and the SCS of the initial uplink BWP, a total number of PRBs contained in the uplink BWP; and based on the number of PRBs required for each PUCCH resource and the total number of PRBs, determining that if the time domain resource of the target PUCCH resource is not determined according to the indication of the indication information, PRB resources of different PUCCH resources are unable to satisfy orthogonality, and determining that the time domain resource of the target PUCCH resource needs to be determined according to the indication of the indication information.

It should be noted that the physical uplink control channel resource determining method provided in the embodiments of this application may be executed by a physical uplink control channel resource determining apparatus, or a control module for performing the physical uplink control channel resource determining method in the physical uplink control channel resource determining apparatus. In the embodiments of this application, the physical uplink control channel resource determining method being performed by the physical uplink control channel resource determining apparatus is used as an example to describe the physical uplink control channel resource determining apparatus provided in the embodiments of this application.

FIG. 4 shows a schematic structural diagram of a physical uplink control channel resource determining apparatus according to an embodiment of this application. As shown in FIG. 4, the apparatus 400 mainly includes: a receiving module 401, an obtaining module 402, and a first determining module 403.

In this embodiment of this application, the receiving module 401 is configured to receive system information, where the system information includes a first index, and the first index is used to indicate one target PUCCH resource set in multiple PUCCH resource sets that are predefined; the obtaining module 402 is configured to obtain a first target parameter configured for the target PUCCH resource set, where the first target parameter includes one or more elements, and one element indicates one value of physical resource block (PRB) count corresponding to the target PUCCH resource set; and the first determining module 403 is configured to determine, based on the first target parameter and a predefined configuration parameter for the target PUCCH resource set, a target physical uplink control channel (PUCCH) resource for use before radio resource control establishment.

In a possible implementation, that the obtaining module 402 obtains the first target parameter configured for the target PUCCH resource set includes:

obtaining the first target parameter from the system information; or obtaining the first target parameter from the predefined configuration parameter for the target PUCCH resource set.

In a possible implementation, that the first determining module 403 determines, based on the first target parameter and the predefined configuration parameter for the target PUCCH resource set, the target physical uplink control channel (PUCCH) resource for use before radio resource control establishment includes:

determining, based on the first target parameter, the number of PRBs contained in the target PUCCH resource; and determining a starting PRB index of the target PUCCH resource based on the first target parameter and the predefined configuration parameter for the target PUCCH resource set.

In a possible implementation, that the first determining module 403 determines, based on the first target parameter, the number of PRBs contained in the target PUCCH resource includes:

if the first target parameter includes multiple elements, determining a target element from the multiple elements based on a second target parameter, where the second target parameter includes: a second index, a subcarrier spacing (SCS) on an initial uplink bandwidth part (BWP) in which the terminal is located, the number of elements in a cyclic shift set of the target PUCCH resource set, and a quantity of the multiple elements, and the second index is an index of the target PUCCH resource in the target PUCCH resource set; and determining that the number of PRBs contained in the target PUCCH resource is equal to a value indicated by the target element.

In a possible implementation, that the first determining module 403 determines the starting PRB index of the target PUCCH resource based on the first target parameter and the predefined configuration parameter for the target PUCCH resource set includes:

in a case that the first target parameter includes one element, determining a starting PRB index of the first hop in the target PUCCH resource based on a third target parameter, and determining a starting PRB index of the second hop in the target PUCCH resource based on a fourth target parameter; or in a case that the first target parameter includes one element, determining a starting PRB index of the first hop in the target PUCCH resource based on a third target parameter, and determining a starting PRB index of the second hop in the target PUCCH resource based on a fourth target parameter; where the third target parameter includes: a BWP physical resource block (PRB) offset $$RB_{BWP}^{offset}$$

of the target PUCCH resource set, a second index, the number of elements in a cyclic shift set of the target PUCCH resource set, and the elements included in the first target parameter, where the second index is an index of the target PUCCH resource in the target PUCCH resource set; and the fourth target parameter includes: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements included in the first target parameter.

In a possible implementation, that the first determining module 403 determines the starting PRB index of the target PUCCH resource based on the first target parameter and the predefined configuration parameter for the target PUCCH resource set includes:

in a case that the first target parameter includes multiple elements, determining a starting PRB index of the first hop in the target PUCCH resource based on a fifth target parameter, and determining a starting PRB index of the second hop in the target PUCCH resource based on a sixth target parameter; or in a case that the first target parameter includes multiple elements, determining a starting PRB index of the first hop in the target PUCCH resource based on a sixth target parameter, and determining a starting PRB index of the second hop in the target PUCCH resource based on a fifth target parameter; where the fifth target parameter includes: a BWP resource block offset $$RB_{BWP}^{offset}$$

of the target PUCCH resource set, a second index, the number of elements in a cyclic shift set of the target PUCCH resource set, and elements included in the first target parameter, where the second index is an index of the target PUCCH resource in the target PUCCH resource set; and the sixth target parameter includes: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements included in the first target parameter.

In a possible implementation, the first target parameter further includes: indication information indicating a time domain resource.

In a possible implementation, the obtaining module 402 is further configured to obtain the indication information from the predefined configuration parameter for the target PUCCH resource set.

In a possible implementation, that the first determining module 403 determines the target physical uplink control channel (PUCCH) resource for use before radio resource control establishment further includes:

determining, based on a second index, one time domain position from multiple time domain positions indicated by the indication information, and determining a time domain resource of the target PUCCH resource based on the determined time domain position, where the second index is an index of the target PUCCH resource in the target PUCCH resource set; or determining, based on a second index, one time domain orthogonal cover code from multiple time domain orthogonal cover codes indicated by the indication information, and determining a time domain resource of the target PUCCH resource based on the determined time domain orthogonal cover code.

In a possible implementation, the first determining module 403 is further configured to perform one of the following before the time domain resource of the target PUCCH resource is determined:

determining, according to an indication of the system information, that the time domain resource of the target PUCCH resource needs to be determined according to the indication of the indication information;

determining, based on a bandwidth and an SCS of an initial uplink BWP in which the terminal is located, that the time domain resource of the target PUCCH resource needs to be determined according to the indication of the indication information; and in a case that the bandwidth of the initial uplink BWP is less than a threshold bandwidth and/or the SCS is greater than a threshold, determining that the time domain resource of the target PUCCH resource needs to be determined according to the indication of the indication information.

In a possible implementation, that the first determining module 403 determines, based on the bandwidth and the SCS of the initial uplink BWP in which the terminal is located, that the time domain resource of the target PUCCH resource needs to be determined according to the indication of the indication information includes:

obtaining, based on the bandwidth and the SCS of the initial uplink BWP, a total number of PRBs contained in the uplink BWP; and based on the number of PRBs required for each PUCCH resource and the total number of PRBs, determining that if the time domain resource of the target PUCCH resource is not determined according to the indication of the indication information, PRB resources of different PUCCH resources are unable to satisfy orthogonality, and determining that the time domain resource of the target PUCCH resource needs to be determined according to the indication of the indication information.

The physical uplink control channel resource determining apparatus 400 in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The physical uplink control channel resource determining apparatus 400 in this embodiment of this application may be an apparatus with an operating system. The operating system may be an Android operating system, an iOS operating system, or other possible operating systems, and is not specifically limited in the embodiments of this application.

The physical uplink control channel resource determining apparatus 400 provided in this embodiment of this application is capable of implementing the processes implemented in the method embodiment in FIG. 2, with the same technical effects achieved. To avoid repetition, details are not described herein again.

FIG. 5 shows a schematic structural diagram of another physical uplink control channel resource determining apparatus according to an embodiment of this application. As shown in FIG. 5, the apparatus 500 mainly includes: a sending module 501 and a second determining module 502.

In this embodiment of this application, the sending module 501 is configured to send system information to a terminal, where the system information includes a first index, and the first index is used to indicate one target PUCCH resource set in multiple PUCCH resource sets that are predefined; and the second determining module 502 is configured to determine, based on a first target parameter configured for the target PUCCH resource set and a predefined configuration parameter for the target PUCCH resource set, a target PUCCH resource for use by the terminal before radio resource control establishment, where the first target parameter includes one or more elements, and one element indicates one value of physical resource block (PRB) count corresponding to the target PUCCH resource set.

In a possible implementation, that the second determining module 502 determines, based on the first target parameter configured for the target PUCCH resource set and the predefined configuration parameter for the target PUCCH resource set, the target PUCCH resource for use by the terminal before radio resource control establishment includes:

determining, based on the first target parameter, the number of PRBs contained in the target PUCCH resource; and determining a starting PRB index of the target PUCCH resource based on the first target parameter and the predefined configuration parameter for the target PUCCH resource set.

In a possible implementation, that the second determining module 502 determines, based on the first target parameter, the number of PRBs contained in the target PUCCH resource includes:

if the first target parameter includes multiple elements, determining a target element from the multiple elements based on a second target parameter, where the second target parameter includes: a second index, a subcarrier spacing (SCS) on an initial uplink bandwidth part (BWP) in which the terminal is located, the number of elements in a cyclic shift set of the target PUCCH resource set, and a quantity of the multiple elements, and the second index is an index of the target PUCCH resource in the target PUCCH resource set; and determining that the number of PRBs contained in the target PUCCH resource is equal to a value indicated by the target element.

In a possible implementation, that the second determining module 502 determines the starting PRB index of the target PUCCH resource based on the first target parameter and the predefined configuration parameter for the target PUCCH resource set includes:

in a case that the first target parameter includes one element, determining a starting PRB index of the first hop in the target PUCCH resource based on a third target parameter, and determining a starting PRB index of the second hop in the target PUCCH resource based on a fourth target parameter; or in a case that the first target parameter includes one element, determining a starting PRB index of the first hop in the target PUCCH resource based on a third target parameter, and determining a starting PRB index of the second hop in the target PUCCH resource based on a fourth target parameter; where the third target parameter includes: a BWP resource block offset $$RB_{BWP}^{offset}$$

of the target PUCCH resource set, a second index, the number of elements in a cyclic shift set of the target PUCCH resource set, and the elements included in the first target parameter, where the second index is an index of the target PUCCH resource in the target PUCCH resource set; and the fourth target parameter includes: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements included in the first target parameter.

In a possible implementation, that the second determining module 502 determines the starting PRB index of the target PUCCH resource based on the first target parameter and the predefined configuration parameter for the target PUCCH resource set includes:

in a case that the first target parameter includes multiple elements, determining a starting PRB index of the first hop in the target PUCCH resource based on a fifth target parameter, and determining a starting PRB index of the second hop in the target PUCCH resource based on a sixth target parameter; or in a case that the first target parameter includes multiple elements, determining a starting PRB index of the first hop in the target PUCCH resource based on a sixth target parameter, and determining a starting PRB index of the second hop in the target PUCCH resource based on a fifth target parameter; where the fifth target parameter includes: a BWP resource block offset $$RB_{BWP}^{offset}$$

of the target PUCCH resource set, a second index, the number of elements in a cyclic shift set of the target PUCCH resource set, and elements included in the first target parameter, where the second index is an index of the target PUCCH resource in the target PUCCH resource set; and the sixth target parameter includes: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements included in the first target parameter.

In a possible implementation, the first target parameter further includes: indication information indicating a time domain resource.

In a possible implementation, that the second determining module 502 determines a target PUCCH resource for use by the terminal before radio resource control establishment further includes:

determining one time domain position from the multiple time domain positions based on a second index, and determining a time domain resource of the target PUCCH resource based on the determined time domain position, where the second index is an index of the target PUCCH resource in the target PUCCH resource set; or determining one time domain orthogonal cover code from the multiple time domain orthogonal cover codes based on a second index, and determining a time domain resource of the target PUCCH resource based on the determined time domain orthogonal cover code.

In a possible implementation, the second determining module 502 is further configured to perform one of the following before the time domain resource of the target PUCCH resource is determined:

indicating, in the system information, that the time domain resource of the target PUCCH resource needs to be determined according to an indication of the indication information;

determining, based on a bandwidth and an SCS of an initial uplink BWP in which the terminal is located, that the time domain resource of the target PUCCH resource needs to be determined according to the indication of the indication information; and in a case that the bandwidth of the initial uplink BWP is less than a threshold bandwidth and/or the SCS is greater than a threshold, determining that the time domain resource of the target PUCCH resource needs to be determined according to the indication of the indication information.

In a possible implementation, that the second determining module 502 determines, based on the bandwidth and the SCS of the initial uplink BWP in which the terminal is located, that the time domain resource of the target PUCCH resource needs to be determined according to the indication of the indication information includes:

obtaining, based on the bandwidth and the SCS of the initial uplink BWP, a total number of PRBs contained in the uplink BWP; and based on the number of PRBs required for each PUCCH resource and the total number of PRBs, determining that if the time domain resource of the target PUCCH resource is not determined according to the indication of the indication information, PRB resources of different PUCCH resources are unable to satisfy orthogonality, and determining that the time domain resource of the target PUCCH resource needs to be determined according to the indication of the indication information.

The physical uplink control channel resource determining apparatus 500 provided in this embodiment of this application is capable of implementing the processes implemented in the method embodiment in FIG. 3, with the same technical effects achieved. To avoid repetition, details are not described herein again.

Figure 6:
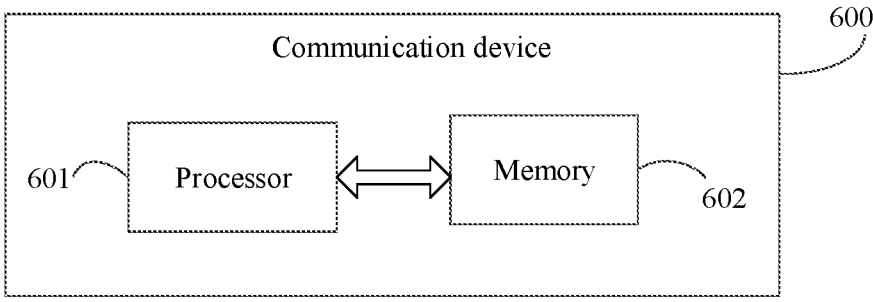
FIG. 6 is a schematic structural diagram of a communications device according to an embodiment of this application.

Optionally, as shown in FIG. 6, an embodiment of this application further provides a communications device 600, including a processor 601, a memory 602, and a program or instructions stored in the memory 602 and capable of running on the processor 601. For example, when the communications device 600 is a terminal and when the program or the instructions are executed by the processor 601, the processes of the foregoing embodiment of the physical uplink control channel resource determining method 200 are implemented, with the same technical effects achieved. When the communications device 600 is a network-side device and when the program or the instructions are executed by the processor 601, the processes of the foregoing embodiment of the physical uplink control channel resource determining method 300 are implemented, with the same technical effects achieved. To avoid repetition, details are not described herein again.

Figure 7:
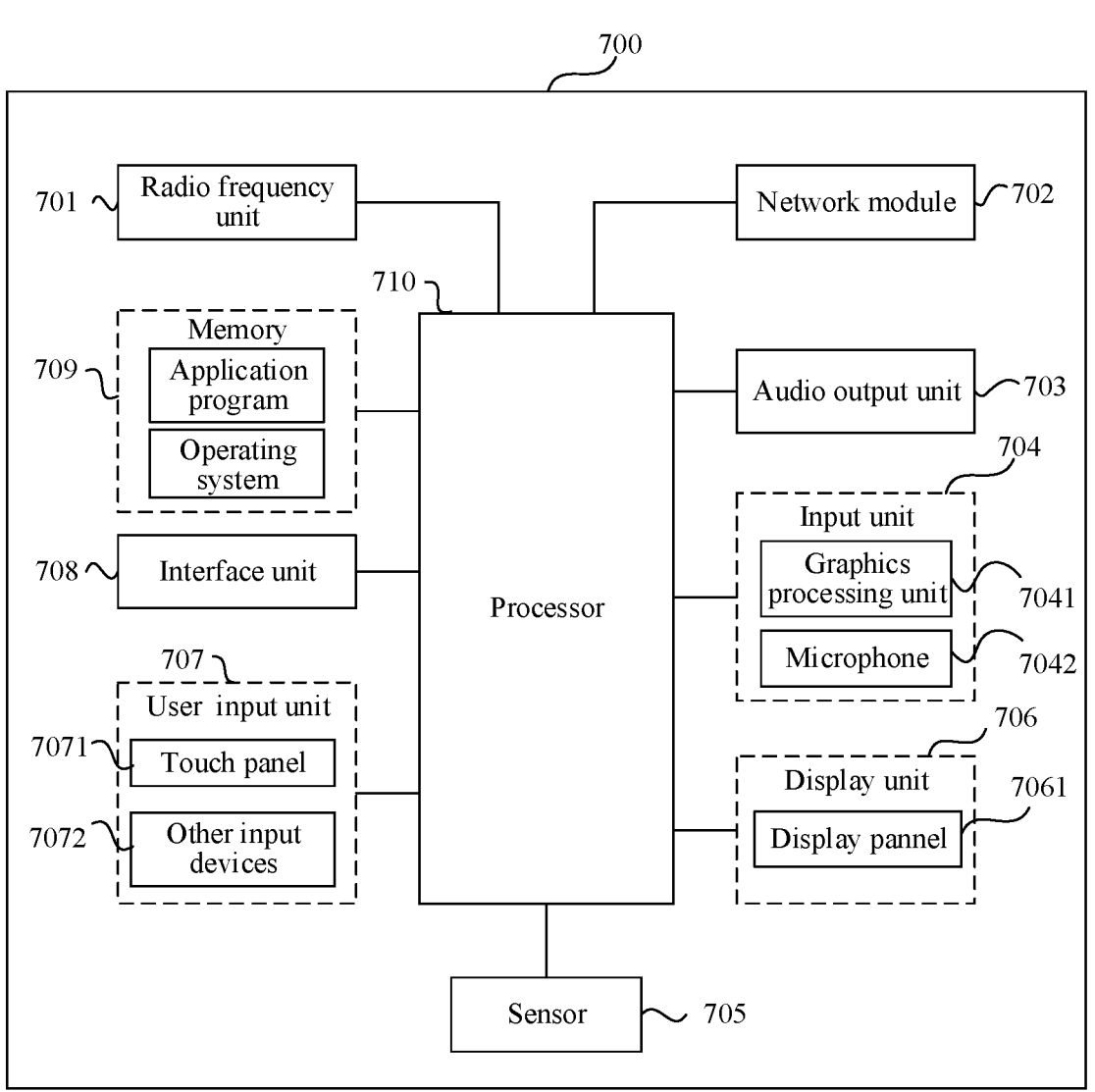
FIG. 7 is a schematic diagram of a hardware structure of a terminal according to an embodiment of this application.

An embodiment of this application further provides a terminal, including a processor and a communications interface, the processor is configured to implement the physical uplink control channel resource determining method 200, and the communications interface is configured to communicate with the network-side device. The terminal embodiments correspond to the foregoing terminal-side method embodiments, and the implementation processes and implementations of the foregoing method embodiments can be applied to the terminal embodiments, with the same technical effects achieved. Specifically, FIG. 7 is a schematic diagram of a hardware structure of a terminal for implementing the embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal 700 may further include a power supply (for example, a battery) supplying power to the components, and the power supply may be logically connected to the processor 710 through a power management system. In this way, functions such as charge management, discharge management, and power consumption management are implemented by using the power management system. The structure of the terminal shown in FIG. 7 does not constitute any limitation on the terminal. The terminal may include more or fewer components than those shown in FIG. 7, or a combination of some components, or the components disposed differently. Details are not described herein again.

It can be understood that in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, and the like. The user input unit 707 may include a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or a power on/off key), a trackball, a mouse, a joystick, and the like. Details are not described herein.

In this embodiment of this application, the radio frequency unit 701 receives downlink data from a network-side device, and then sends the downlink data to the processor 710 for processing; and also sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may include a program or instruction storage area and a data storage area. The program or instruction storage area may store an operating system, an application program or instruction required by at least one function (for example, a sound playback function or an image playback function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, for example, being a baseband processor. It can be understood that the modem processor may alternatively be not integrated in the processor 710.

The radio frequency unit 701 is configured to receive system information, where the system information includes a first index, and the first index is used to indicate one target PUCCH resource set in multiple PUCCH resource sets that are predefined.

The processor 710 is configured to obtain a first target parameter configured for the target PUCCH resource set, where the first target parameter includes one or more elements, and one element indicates one value of physical resource block (PRB) count corresponding to the target PUCCH resource set; and determine, based on the first target parameter and a predefined configuration parameter for the target PUCCH resource set, a target physical uplink control channel (PUCCH) resource for use by the terminal before radio resource control establishment.

The terminal provided in this embodiment of this application obtains the index of the target PUCCH resource set from the system information, determines a PUCCH resource set to which the target PUCCH resource belongs, and obtains the first target parameter configured for the target PUCCH resource set, where the first target parameter includes one or more elements, and one element indicates one value of PRB count corresponding to the target PUCCH resource set; and then the terminal can determine, based on the first target parameter and the predefined configuration parameter for the target PUCCH resource set, the target PUCCH resource for use before radio resource control establishment. With the technical solution provided in the embodiments of this application, multiple PRBs can be configured for the target PUCCH resource set, so as to resolve the problem of how to determine PUCCH resources in a case that multi-PRB resource allocation is supported for PUCCH format 0 and/or PUCCH format 1.

An embodiment of this application further provides a network-side device, including a processor and a communications interface, the processor is configured to implement the physical uplink control channel resource determining method 300, and the communications interface is configured to communicate with the terminal. The network-side device embodiments correspond to the foregoing terminal-side method embodiments, and the implementation processes and implementations of the foregoing method embodiments can be applied to the network-side device embodiments, with the same technical effects achieved.

Figure 8:
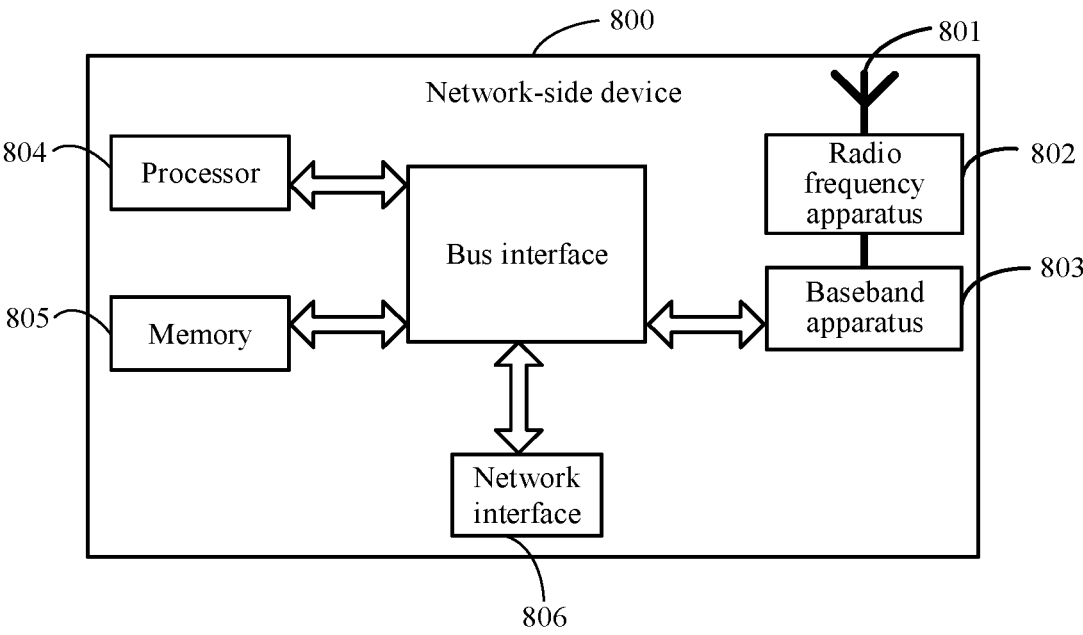
FIG. 8 is a schematic diagram of a hardware structure of a network-side device according to an embodiment of this application.

Specifically, an embodiment of this application further provides a network-side device. As shown in FIG. 8, the network device 800 includes an antenna 801, a radio frequency apparatus 802, and a baseband apparatus 803 The antenna 801 is connected to the radio frequency apparatus 802 In an uplink direction, the radio frequency apparatus 802 receives information by using the antenna 801, and sends the received information to the baseband apparatus 803 for processing. In a downlink direction, the baseband apparatus 803 processes to-be-sent information, and sends the information to the radio frequency apparatus 802; and the radio frequency apparatus 802 processes the received information and then sends the information out by using the antenna 801.

The frequency band processing apparatus may be located in the baseband apparatus 803. The method performed by the network-side device in the foregoing embodiments may be implemented in the baseband apparatus 803, and the baseband apparatus 803 includes a processor 804 and a memory 805.

The baseband apparatus 803 may include, for example, at least one baseband processing unit, where multiple chips are disposed on the baseband processing unit. As shown in FIG. 8, one of the chips is, for example, the processor 804, connected to the memory 805, to invoke a program in the memory 805 to perform the operation of the network device shown in the foregoing method embodiment.

The baseband apparatus 803 may further include a network interface 806, configured to exchange information with the radio frequency apparatus 802, where the interface is, for example, a common public radio interface (CPRI for short).

Specifically, the network-side device in this embodiment of the present application further includes: instructions or a program stored in the memory 805 and capable of running on the processor 804. The processor 804 invokes the instructions or program in the memory 805 to execute the method executed by the modules shown in FIG. 5, with the same technical effects achieved. To avoid repetition, details are not repeated herein.

An embodiment of this application further provides a readable storage medium, where a program or an instruction is stored in the readable storage medium. When the program or the instruction is executed by a processor, the processes of the foregoing embodiments of the physical uplink control channel resource determining method 200 or the physical uplink control channel resource determining method 300 can be implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the physical uplink control channel resource determining method 200 or the physical uplink control channel resource determining method 300, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that in this specification, the term "include", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A physical uplink control channel (PUCCH) resource determining method, comprising:

receiving, by a terminal, system information, wherein the system information comprises a first index, and the first index is used to indicate one target PUCCH resource set in multiple PUCCH resource sets that are predefined;

obtaining, by the terminal, a first target parameter configured for the target PUCCH resource set, wherein the first target parameter comprises one or more elements, and one such element indicates one value of a physical resource block (PRB) count corresponding to the target PUCCH resource set; and determining, by the terminal based on the first target parameter and a predefined configuration parameter for the target PUCCH resource set, a target PUCCH resource for use before a specific PUCCH resource is configured;

wherein the determining, by the terminal based on the first target parameter and a predefined configuration parameter for the target PUCCH resource set, a target PUCCH resource before a specific PUCCH resource is configured comprises:

determining, by the terminal based on the first target parameter, the number of PRBs in the target PUCCH resource; and determining, by the terminal, a starting PRB index of the target PUCCH resource based on the first targe parameter and the predefined configuration parameter for the target PUCCH resource set;

wherein the determining, by the terminal, a starting PRB index of the target PUCCH resource based on the first target parameter and the predefined configuration parameter for the target PUCCH resource set comprises:

in a case that the first target parameter comprises one element, determining, by the terminal, a starting PRB index of a first hop in the target PUCCH resource based on a third target parameter, and determining a starting PRB index of a second hop in the target PUCCH resource based on a fourth target parameter; or in a case that the first target parameter comprises one element, determining, by the terminal, a starting PRB index of the first hop in the target PUCCH resource based on a fourth target parameter, and determining a starting PRB index of the second hop in the target PUCCH resource based on a third target parameter; wherein the third target parameter comprises: a Bandwidth Part (BWP) PRB offset $$RB_{BWP}^{offset}$$

of the target PUCCH resource set, a second index, the number of elements in a cyclic shift set of the target PUCCH resource set, and the elements comprised in the first target parameter, wherein the second index is an index of the target PUCCH resource in the target PUCCH resource set; and the fourth parameter comprises: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements comprised in the first target parameter.

2. The method according to claim 1, wherein the obtaining, by the terminal, a first target parameter configured for the target PUCCH resource set comprises:

obtaining, by the terminal, the first target parameter from the system information; or obtaining, by the terminal, the first target parameter from the predefined configuration parameter for the target PUCCH resource set.

3. The method according to claim 1, wherein the determining, by the terminal based on the first target parameter, the number of PRBs contained in the target PUCCH resource comprises:

if the first target parameter comprises multiple elements, determining, by the terminal, a target element from the multiple elements based on a second target parameter, wherein the second target parameter comprises: a second index, a subcarrier spacing (SCS) of an initial uplink bandwidth part (BWP) in which the terminal is located, the number of elements in a cyclic shift set of the target PUCCH resource set, and a quantity of the multiple elements, and the second index is an index of the target PUCCH resource in the target PUCCH resource set; and determining that the number of PRBs contained in the target PUCCH resource is equal to a value indicated by the target element.

4. The method according to claim 1, wherein the determining, by the terminal, a starting PRB index of the target PUCCH resource based on the first target parameter and the predefined configuration parameter for the target PUCCH resource set further comprises:

in a case that the first target parameter comprises multiple elements, determining, by the terminal, a starting PRB index of the first hop in the target PUCCH resource based on a fifth target parameter, and determining a starting PRB index of the second hop in the target PUCCH resource based on a sixth target parameter; or in a case that the first target parameter comprises multiple elements, determining, by the terminal, a starting PRB index of the first hop in the target PUCCH resource based on a sixth target parameter, and determining a starting PRB index of the second hop in the target PUCCH resource based on a fifth target parameter; wherein the fifth target parameter comprises: a BWP resource block offset $$RB_{BWP}^{offset}$$

of the target PUCCH resource set, a second index, the number of elements in a cyclic shift set of the target PUCCH resource set, and elements comprised in the first target parameter, wherein the second index is an index of the target PUCCH resource in the target PUCCH resource set; and the sixth target parameter comprises: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements comprised in the first target parameter.

5. The method according to claim 1, wherein the first target parameter further comprises: indication information indicating a time domain resource.

6. The method according to claim 5, wherein the obtaining, by the terminal, a first target parameter configured for the target PUCCH resource set further comprises:

obtaining, by the terminal, the indication information from the predefined configuration parameter for the target PUCCH resource set;

the indication information indicates multiple time domain positions; or the indication information indicates multiple time domain orthogonal cover codes;

wherein the determining a target physical uplink control channel (PUCCH) resource for use before radio resource control establishment further comprises:

determining, by the terminal, one time domain position from the multiple time domain positions based on a second index, and determining a time domain resource of the target PUCCH resource based on the determined time domain position, wherein the second index is an index of the target PUCCH resource in the target PUCCH resource set; or determining, by the terminal, one time domain orthogonal cover code from the multiple time domain orthogonal cover codes based on a second index, and determining a time domain resource of the target PUCCH resource based on the determined time domain orthogonal cover code;

wherein before the determining a time domain resource of the target PUCCH resource, the method further comprises one of the following:

determining, by the terminal according to an indication of the system information, that the time domain resource of the target PUCCH resource needs to be determined according to the indication of the indication information;

determining, by the terminal based on a bandwidth and an SCS of an initial uplink BWP in which the terminal is located, that the time domain resource of the target PUCCH resource needs to be determined according to the indication of the indication information; and in a case that the bandwidth of the initial uplink BWP is less than a threshold bandwidth and/or the SCS is greater than a threshold, determining that the time domain resource of the target PUCCH resource needs to be determined according to the indication of the indication information;

wherein the determining, by the terminal based on a bandwidth and an SCS of an initial uplink BWP in which the terminal is located, that the time domain resource of the target PUCCH resource needs to be determined according to the indication of the indication information comprises:

obtaining, based on the bandwidth and the SCS of the initial uplink BWP, a total number of PRBs contained in the uplink BWP; and based on the number of PRBs required for each PUCCH resource and the total number of PRBs, determining that if the time domain resource of the target PUCCH resource is not determined according to the indication of the indication information, PRB resources of different PUCCH resources are unable to satisfy orthogonality, and determining that the time domain resource of the target PUCCH resource needs to be determined according to the indication of the indication information.

7. A physical uplink control channel resource determining method, comprising:

sending, by a network-side device, system information to a terminal, wherein the system information comprises a first index, and the first index is used to indicate one target PUCCH resource set in multiple PUCCH resource sets that are predefined; and determining, by the network-side device based on a first target parameter configured for the target PUCCH resource set and a predefined configuration parameter for the target PUCCH resource set, a target PUCCH resource before a specific PUCCH resource is configured, wherein the first target parameter comprises one or more elements, and one element indicates one value of PRB count corresponding to the target PUCCH resource set;

wherein determining, by the network-side device based on a first target parameter configured for the target PUCCH resource set and a predefined configuration parameter for the target PUCCH resource set, a target PUCCH resource for use by the terminal before a specific PUCCH resource is configured comprises:

determining, by the network-side device based on the first target parameter, the number of PRBs contained in the target PUCCH resource; and determining, by the network-side device, a starting PRB index of the target PUCCH resource based on the first target parameter and the predefined configuration parameter for the target PUCCH resource set;

wherein the determining, by the network-side device, a starting PRB index of the target PUCCH resource based on the first target parameter and the predefined configuration parameter for the target PUCCH resource set comprises:

in a case that the first target parameter comprises one element, determining, by the network-side device, a starting PRB index of a first hop in the target PUCCH resource based on a third target parameter, and determining a starting PRB index of a second hop in the target PUCCH resource based on a fourth target parameter; or in a case that the first target parameter comprises one element, determining, by the network-side device, a starting PRB index of the first hop in the target PUCCH resource based on a fourth target parameter, and determining a starting PRB index of the second hop in the target PUCCH resource based on a third target parameter; wherein the third target parameter comprises: a BWP PRB offset $$RB_{BWP}^{offset}$$

of the target PUCCH resource set, a second index, the number of elements in a cyclic shift set of the target PUCCH resource set, and the elements comprised in the first target parameter, wherein the second index is an index of the target PUCCH resource in the target PUCCH resource set; and the fourth target parameter comprises: a bandwidth of an initial uplink BWP in which the terminal is located, a BWP resource block offset $$RB_{BWP}^{offset}$$

of the target PUCCH resource set, the second index, the number of elements in the cyclic shift set of the target PUCCH resource set, and the elements comprised in the first target parameter.

8. The method according to claim 7, wherein the predefined configuration parameter for the target PUCCH resource set comprises the first target parameter;

the system information further comprises the first target parameter.

9. The method according to claim 7, wherein the determining, by the network-side device based on the first target parameter, the number of PRBs contained in the target PUCCH resource comprises:

if the first target parameter comprises multiple elements, determining, by the network-side device, a target element from the multiple elements based on a second target parameter, wherein the second target parameter comprises: a second index, a subcarrier spacing (SCS) on an initial uplink bandwidth part (BWP) in which the terminal is located, the number of elements in a cyclic shift set of the target PUCCH resource set, and a quantity of the multiple elements, and the second index is an index of the target PUCCH resource in the target PUCCH resource set; and determining that the number of PRBs contained in the target PUCCH resource is equal to a value indicated by the target element.

10. The method according to claim 7, wherein the determining, by the network-side device, a starting PRB index of the target PUCCH resource based on the first target parameter and the predefined configuration parameter for the target PUCCH resource set further comprises:

in a case that the first target parameter comprises multiple elements, determining, by the network-side device, a starting PRB index of the first hop in the target PUCCH resource based on a fifth target parameter, and determining a starting PRB index of the second hop in the target PUCCH resource based on a sixth target parameter; or in a case that the first target parameter comprises multiple elements, determining, by the network-side device, a starting PRB index of the first hop in the target PUCCH resource based on a sixth target parameter, and determining a starting PRB index of the second hop in the target PUCCH resource based on a fifth target parameter; wherein the fifth target parameter comprises: the BWP resource block offset $$RB_{BWP}^{offset}$$

of the target PUCCH resource set, a second index, the number of elements in a cyclic shift set of the target PUCCH resource set, and elements comprised in the first target parameter, wherein the second index is an index of the target PUCCH resource in the target PUCCH resource set; and the sixth target parameter comprises: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements comprised in the first target parameter.

11. The method according to claim 7, wherein the first target parameter further comprises: indication information indicating a time domain resource;

wherein the predefined configuration parameter for the target PUCCH resource set comprises the indication information;

the indication information indicates multiple time domain positions; or the indication information indicates multiple time domain orthogonal cover codes;

wherein the determining a target PUCCH resource for use by the terminal before radio resource control establishment further comprises:

determining, by the network-side device, one time domain position from the multiple time domain positions based on a second index, and determining a time domain resource of the target PUCCH resource based on the determined time domain position, wherein the second index is an index of the target PUCCH resource in the target PUCCH resource set; or determining, by the network-side device, one time domain orthogonal cover code from the multiple time domain orthogonal cover codes based on a second index, and determining a time domain resource of the target PUCCH resource based on the determined time domain orthogonal cover code;

wherein before the determining a time domain resource of the target PUCCH resource, the method further comprises one of the following:

indicating, by the network-side device, in the system information that the time domain resource of the target PUCCH resource needs to be determined according to an indication of the indication information;

determining, by the network-side device based on a bandwidth and an SCS of an initial uplink BWP in which the terminal is located, that the time domain resource of the target PUCCH resource needs to be determined according to the indication of the indication information; and in a case that the bandwidth of the initial uplink BWP is less than a threshold bandwidth and/or the SCS is greater than a threshold, determining that the time domain resource of the target PUCCH resource needs to be determined according to the indication of the indication information;

wherein the determining, by the network-side device based on a bandwidth and an SCS of an initial uplink BWP in which the terminal is located, that the time domain resource of the target PUCCH resource needs to be determined according to the indication of the indication information comprises:

obtaining, based on the bandwidth and the SCS of the initial uplink BWP, a total number of PRBs contained in the uplink BWP; and based on the number of PRBs required for each PUCCH resource and the total number of PRBs, determining that if the time domain resource of the target PUCCH resource is not determined according to the indication of the indication information, PRB resources of different PUCCH resources are unable to satisfy orthogonality, and determining that the time domain resource of the target PUCCH resource needs to be determined according to the indication of the indication information.

12. A physical uplink control channel resource determining apparatus, comprising: a memory, a processor and a computer program stored in the memory and executable by the processor, wherein the processor executes the computer program to:

receive system information, wherein the system information comprises a first index, and the first index is used to indicate one target PUCCH resource set in multiple PUCCH resource sets that are predefined;

obtain a first target parameter configured for the target PUCCH resource set, wherein the first target parameter comprises one or more elements, and one element indicates one value of physical resource block (PRB) count corresponding to the target PUCCH resource set; and determine, based on the first target parameter and a predefined configuration parameter for the target PUCCH resource set, a target physical uplink control channel (PUCCH) resource before a specific PUCCH resource is configured;

wherein the processor executes the computer program to:

determine, based on the first target parameter, the number of PRBs contained in the target PUCCH resource; and determine a starting PRB index of the target PUCCH resource based on the first target parameter and the predefined configuration parameter for the target PUCCH resource set;

wherein the processor executes the computer program to:

in a case that the first target parameter comprises one element, determine a starting PRB index of a first hop in the target PUCCH resource based on a third target parameter, and determine a starting PRB index of a second hop in the target PUCCH resource based on a fourth target parameter; or in a case that the first target parameter comprises one element, determine a starting PRB index of the first hop in the target PUCCH resource based on a third target parameter, and determine a starting PRB index of the second hop in the target PUCCH resource based on a fourth target parameter; wherein the third target parameter comprises: a BWP PRB offset $$RB_{BWP}^{offset}$$

of the target PUCCH resource set, a second index, the number of elements in a cyclic shift set of the target PUCCH resource set, and the elements comprised in the first target parameter, wherein the second index is an index of the target PUCCH resource in the target PUCCH resource set; and the fourth target parameter comprises: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements comprised in the first target parameter.

13. The apparatus according to claim 12, wherein the processor executes the computer program to:

obtain the first target parameter from the system information; or obtain the first target parameter from the predefined configuration parameter for the target PUCCH resource set.

14. The apparatus according to claim 12, wherein the processor executes the computer program to:

if the first target parameter comprises multiple elements, determine a target element from the multiple elements based on a second target parameter, wherein the second target parameter comprises: a second index, a subcarrier spacing (SCS) on an initial uplink bandwidth part (BWP) in which the terminal is located, the number of elements in a cyclic shift set of the target PUCCH resource set, and a quantity of the multiple elements, and the second index is an index of the target PUCCH resource in the target PUCCH resource set; and determine that the number of PRBs contained in the target PUCCH resource is equal to a value indicated by the target element;

the processor executes the computer program to:

in a case that the first target parameter comprises multiple elements, determine a starting PRB index of the first hop in the target PUCCH resource based on a fifth target parameter, and determine a starting PRB index of the second hop in the target PUCCH resource based on a sixth target parameter; or in a case that the first target parameter comprises multiple elements, determine a starting PRB index of the first hop in the target PUCCH resource based on a sixth target parameter, and determine a starting PRB index of the second hop in the target PUCCH resource based on a fifth target parameter; wherein the fifth target parameter comprises: a BWP resource block offset $$RB_{BWP}^{offset}$$

of the target PUCCH resource set, a second index, the number of elements in a cyclic shift set of the target PUCCH resource set, and elements comprised in the first target parameter, wherein the second index is an index of the target PUCCH resource in the target PUCCH resource set; and the sixth target parameter comprises: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements comprised in the first target parameter.

15. The apparatus according to claim 12, wherein the first target parameter further comprises: indication information indicating a time domain resource;

wherein the processor executes the computer program to: obtain the indication information from the predefined configuration parameter for the target PUCCH resource set;

the processor executes the computer program to:

determine, based on a second index, one time domain position from multiple time domain positions indicated by the indication information, and determine a time domain resource of the target PUCCH resource based on the determined time domain position, wherein the second index is an index of the target PUCCH resource in the target PUCCH resource set; or determine, based on a second index, one time domain orthogonal cover code from multiple time domain orthogonal cover codes indicated by the indication information, and determine a time domain resource of the target PUCCH resource based on the determined time domain orthogonal cover code;

wherein the processor executes the computer program to: perform one of the following before the time domain resource of the target PUCCH resource is determined:

determining, according to an indication of the system information, that the time domain resource of the target PUCCH resource needs to be determined according to the indication of the indication information;

determining, based on a bandwidth and an SCS of an initial uplink BWP in which the terminal is located, that the time domain resource of the target PUCCH resource needs to be determined according to the indication of the indication information; and in a case that the bandwidth of the initial uplink BWP is less than a threshold bandwidth and/or the SCS is greater than a threshold, determining that the time domain resource of the target PUCCH resource needs to be determined according to the indication of the indication information;

wherein the processor executes the computer program to:

obtain, based on the bandwidth and the SCS of the initial uplink BWP, a total number of PRBs contained in the uplink BWP; and based on the number of PRBs required for each PUCCH resource and the total number of PRBs, determine that if the time domain resource of the target PUCCH resource is not determined according to the indication of the indication information, PRB resources of different PUCCH resources are unable to satisfy orthogonality, and determine that the time domain resource of the target PUCCH resource needs to be determined according to the indication of the indication information.

16. A physical uplink control channel resource determining apparatus, comprising: a memory, a processor and a computer program stored in the memory and executable by the processor, wherein the processor executes the computer program to: implement the steps of the physical uplink control channel resource determining method according to claim 7.

17. The apparatus according to claim 16, wherein the processor executes the computer program to:

if the first target parameter comprises multiple elements, determine a target element from the multiple elements based on a second target parameter, wherein the second target parameter comprises: a second index, a subcarrier spacing (SCS) on an initial uplink bandwidth part (BWP) in which the terminal is located, the number of elements in a cyclic shift set of the target PUCCH resource set, and a quantity of the multiple elements, and the second index is an index of the target PUCCH resource in the target PUCCH resource set; and determine that the number of PRBs contained in the target PUCCH resource is equal to a value indicated by the target element;

the processor executes the computer program to:

in a case that the first target parameter comprises multiple elements, determine a starting PRB index of the first hop in the target PUCCH resource based on a fifth target parameter, and determine a starting PRB index of the second hop in the target PUCCH resource based on a sixth target parameter; or in a case that the first target parameter comprises multiple elements, determine a starting PRB index of the first hop in the target PUCCH resource based on a sixth target parameter, and determine a starting PRB index of the second hop in the target PUCCH resource based on a fifth target parameter; wherein the fifth target parameter comprises: a BWP resource block offset $$RB_{BWP}^{offset}$$

of the target PUCCH resource set, a second index, the number of elements in a cyclic shift set of the target PUCCH resource set, and elements comprised in the first target parameter, wherein the second index is an index of the target PUCCH resource in the target PUCCH resource set; and the sixth target parameter comprises: a bandwidth of an initial uplink BWP in which the terminal is located, the BWP resource block offset $$RB_{BWP}^{offset}$$

of the target PUCCH resource set, the second index, the number of elements in the cyclic shift set of the target PUCCH resource set, and the elements comprised in the first target parameter.

18. The apparatus according to claim 16, wherein the first target parameter further comprises: indication information indicating a time domain resource;

wherein the processor executes the computer program to:

determine one time domain position from the multiple time domain positions based on a second index, and determine a time domain resource of the target PUCCH resource based on the determined time domain position, wherein the second index is an index of the target PUCCH resource in the target PUCCH resource set; or determine one time domain orthogonal cover code from the multiple time domain orthogonal cover codes based on a second index, and determine a time domain resource of the target PUCCH resource based on the determined time domain orthogonal cover code;

wherein the processor executes the computer program to perform one of the following before the time domain resource of the target PUCCH resource is determined:

indicating, in the system information, that the time domain resource of the target PUCCH resource needs to be determined according to an indication of the indication information;

determining, based on a bandwidth and an SCS of an initial uplink BWP in which the terminal is located, that the time domain resource of the target PUCCH resource needs to be determined according to the indication of the indication information; and in a case that the bandwidth of the initial uplink BWP is less than a threshold bandwidth and/or the SCS is greater than a threshold, determining that the time domain resource of the target PUCCH resource needs to be determined according to the indication of the indication information;

wherein the processor executes the computer program to:

obtain, based on the bandwidth and the SCS of the initial uplink BWP, a total number of PRBs contained in the uplink BWP; and based on the number of PRBs required for each PUCCH resource and the total number of PRBs, determine that if the time domain resource of the target PUCCH resource is not determined according to the indication of the indication information, PRB resources of different PUCCH resources are unable to satisfy orthogonality, and determine that the time domain resource of the target PUCCH resource needs to be determined according to the indication of the indication information.

19. The method according to claim 1, wherein the method further comprises: in a case that $[r_{PUCCH}/8]=0$, determining, by the terminal, that a PRB index of the first hop is $$(RB_{BWP}^{offset} + \lfloor r_{PUCCH}/N_{CS} \rfloor) * (PRB_{number});$$

and in a case that $[r_{PUCCH}/8]=1$, determining, by the terminal, that a PRB index of the second hop is $$\left(RB_{BWP}^{offset} + \lfloor r_{PUCCH}/N_{CS}\rfloor\right) * (PRB_{number});$$

wherein the $$RB_{BWP}^{offset} \text{ is } RB_{BWP}^{offset}$$

of the target PUCCH resource set, $PRB_{number}$ is the number of PRBs contained in the target PUCCH resource, $N_{CS}$ is a total number of cyclic shift sequences in a cyclic shift sequence set corresponding to the target PUCCH resource set, $r_{PUCCH}$ is the second index which is an index of the target PUCCH resource in the target PUCCH resource set.

20. The apparatus according to claim 12, wherein the processor executes the computer program to:

in a case that $[r_{PUCCH}/8]=0$, determine that a PRB index of the first hop is $$\left(RB_{BWP}^{offset} + \lfloor r_{PUCCH}/N_{CS}\rfloor\right) * (PRB_{number});$$

in a case that $[r_{PUCCH}/8]=1$, determine that a PRB index of the second hop is $$\left(RB_{BWP}^{offset} + \lfloor r_{PUCCH}/N_{CS}\rfloor\right) * (PRB_{number});$$

wherein the $$RB_{BWP}^{offset} \text{ is } RB_{BWP}^{offset}$$

of the target PUCCH resource set, $PRB_{number}$ is the number of PRBs contained in the target PUCCH resource, $N_{CS}$ is a total number of cyclic shift sequences in a cyclic shift sequence set corresponding to the target PUCCH resource set, $r_{PUCCH}$ is the second index which is an index of the target PUCCH resource in the target PUCCH resource set.

* * * * *